(12) United States Patent
Goodrich et al.

(10) Patent No.: US 12,229,342 B2
(45) Date of Patent: Feb. 18, 2025

(54) GESTURE CONTROL ON AN EYEWEAR DEVICE

(71) Applicant: Snap Inc., Santa Monica, CA (US)

(72) Inventors: Kyle Goodrich, Venice, CA (US); Andrew James McPhee, Culver City, CA (US); Daniel Moreno, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/410,787

(22) Filed: Aug. 24, 2021

(65) Prior Publication Data
US 2022/0197393 A1  Jun. 23, 2022

Related U.S. Application Data

(60) Provisional application No. 63/129,323, filed on Dec. 22, 2020.

(51) Int. Cl.
| | |
|---|---|
| *G06F 3/01* | (2006.01) |
| *G06F 3/04815* | (2022.01) |
| *G06F 3/0482* | (2013.01) |
| *G06F 3/04845* | (2022.01) |
| *G06F 3/04855* | (2022.01) |

(52) U.S. Cl.
CPC .............. *G06F 3/017* (2013.01); *G06F 3/011* (2013.01); *G06F 3/04815* (2013.01); *G06F 3/0482* (2013.01); *G06F 3/04845* (2013.01); *G06F 3/04855* (2013.01)

(58) Field of Classification Search
CPC .... G06F 3/017; G06F 3/04815; G06F 3/0482; G06F 3/04845; G06F 3/044855; G06F 3/011
See application file for complete search history.

(56) References Cited

U.S. PATENT DOCUMENTS

| | | |
|---|---|---|
| 6,750,890 B1 | 6/2004 | Sugimoto et al. |
| 7,971,156 B2 | 6/2011 | Albertson et al. |

(Continued)

FOREIGN PATENT DOCUMENTS

| | | |
|---|---|---|
| CN | 103049761 | 8/2016 |
| CN | 109885367 | 6/2019 |

(Continued)

OTHER PUBLICATIONS

"U.S. Appl. No. 17/410,814, Non Final Office Action dated Jan. 12, 2022", 22 pgs.

(Continued)

*Primary Examiner* — Tuyetlien T Tran
*Assistant Examiner* — Jianmei F Duckworth
(74) *Attorney, Agent, or Firm* — Schwegman Lundberg & Woessner, P.A.

(57) ABSTRACT

Systems and methods are provided for performing operations comprising: displaying one or more virtual objects on an eyewear device; detecting, by a camera of the eyewear device, a hand within view of the eyewear device; determining that a first finger of the hand is oriented along a same direction as the one or more virtual objects that are displayed; detecting movement of a second finger of the hand relative to the first finger; and controlling the display of the one or more virtual objects in response to detecting movement of the second finger to the first finger.

16 Claims, 11 Drawing Sheets

(56) References Cited

U.S. PATENT DOCUMENTS

| | | | |
|---|---|---|---|
| 7,996,793 B2 | 8/2011 | Latta et al. | |
| 8,487,938 B2 | 7/2013 | Latta et al. | |
| 8,856,691 B2 | 10/2014 | Geisner et al. | |
| 8,971,572 B1* | 3/2015 | Yin | G06T 7/73 |
| | | | 345/173 |
| 9,225,897 B1 | 12/2015 | Sehn et al. | |
| 9,230,160 B1 | 1/2016 | Kanter | |
| 9,270,811 B1 | 2/2016 | Atlas | |
| 9,276,886 B1 | 3/2016 | Samaranayake | |
| 9,292,082 B1 | 3/2016 | Patel et al. | |
| 9,705,831 B2 | 7/2017 | Spiegel | |
| 9,742,713 B2 | 8/2017 | Spiegel et al. | |
| 9,977,523 B1 | 5/2018 | Kim et al. | |
| 9,992,241 B1 | 6/2018 | Huang et al. | |
| 10,061,352 B1 | 8/2018 | Trail | |
| 10,102,423 B2 | 10/2018 | Shaburov et al. | |
| 10,261,595 B1* | 4/2019 | Kin | G06F 3/04815 |
| 10,281,992 B2 | 5/2019 | Cohen et al. | |
| 10,284,508 B1 | 5/2019 | Allen et al. | |
| 10,289,660 B2 | 5/2019 | Karunamuni et al. | |
| 10,402,081 B1* | 9/2019 | Andersen | G06F 3/04855 |
| 10,439,972 B1 | 10/2019 | Spiegel et al. | |
| 10,503,264 B1 | 12/2019 | Blachly et al. | |
| 10,509,466 B1 | 12/2019 | Miller et al. | |
| 10,514,876 B2 | 12/2019 | Sehn | |
| 10,515,484 B1 | 12/2019 | Lucas et al. | |
| 10,551,937 B2* | 2/2020 | Dash | G06F 1/163 |
| 10,579,869 B1 | 3/2020 | Xiong et al. | |
| 10,591,730 B2 | 3/2020 | Rodriguez, II et al. | |
| 10,614,855 B2 | 4/2020 | Huang | |
| 10,748,347 B1 | 8/2020 | Li et al. | |
| 10,852,814 B1 | 12/2020 | Caron et al. | |
| 10,957,059 B1* | 3/2021 | Katz | H04N 13/327 |
| 10,958,608 B1 | 3/2021 | Allen et al. | |
| 10,962,809 B1 | 3/2021 | Castañeda | |
| 10,996,846 B2 | 5/2021 | Robertson et al. | |
| 10,997,787 B2* | 5/2021 | Ge | G06V 10/82 |
| 11,012,390 B1 | 5/2021 | Al Majid et al. | |
| 11,030,454 B1 | 6/2021 | Xiong et al. | |
| 11,036,368 B1 | 6/2021 | Al Majid et al. | |
| 11,062,498 B1 | 7/2021 | Voss et al. | |
| 11,087,728 B1 | 8/2021 | Canberk et al. | |
| 11,092,998 B1 | 8/2021 | Castañeda et al. | |
| 11,106,342 B1 | 8/2021 | Al Majid et al. | |
| 11,126,206 B2 | 9/2021 | Meisenholder et al. | |
| 11,143,867 B2 | 10/2021 | Rodriguez, II | |
| 11,169,600 B1 | 11/2021 | Canberk et al. | |
| 11,227,626 B1 | 1/2022 | Krishnan Gorumkonda et al. | |
| 11,237,640 B2* | 2/2022 | Zhu | G06F 3/017 |
| 11,249,556 B1* | 2/2022 | Schwarz | G06F 3/011 |
| 11,307,747 B2 | 4/2022 | Dancie et al. | |
| 11,340,756 B2* | 5/2022 | Faulkner | G06F 1/1626 |
| 11,361,735 B1 | 6/2022 | Wang et al. | |
| 11,455,078 B1 | 9/2022 | Goodrich et al. | |
| 11,531,402 B1 | 12/2022 | Stolzenberg | |
| 11,546,505 B2 | 1/2023 | Canberk | |
| 11,782,577 B2 | 10/2023 | Goodrich et al. | |
| 11,797,162 B2 | 10/2023 | Goodrich et al. | |
| 11,847,302 B2 | 12/2023 | Goodrich et al. | |
| 2003/0090524 A1* | 5/2003 | Segerberg | H04N 21/4312 |
| | | | 715/786 |
| 2003/0154300 A1 | 8/2003 | Mostafa | |
| 2004/0203956 A1 | 10/2004 | Tsampalis | |
| 2004/0233238 A1* | 11/2004 | Lahdesmaki | H04N 21/4622 |
| | | | 715/810 |
| 2005/0076309 A1 | 4/2005 | Goldsmith | |
| 2005/0108392 A1 | 5/2005 | Glasser et al. | |
| 2005/0160451 A1 | 7/2005 | Batra et al. | |
| 2005/0210410 A1* | 9/2005 | Ohwa | G06F 3/0482 |
| | | | 715/767 |
| 2006/0001650 A1 | 1/2006 | Robbins et al. | |
| 2007/0150830 A1* | 6/2007 | Ording | G06F 3/0481 |
| | | | 715/784 |
| 2008/0114850 A1 | 5/2008 | Skog et al. | |
| 2009/0012788 A1 | 1/2009 | Gilbert et al. | |
| 2009/0177641 A1 | 7/2009 | Raghavan | |
| 2010/0125811 A1 | 5/2010 | Moore et al. | |
| 2010/0289740 A1* | 11/2010 | Kim | G06F 3/046 |
| | | | 345/157 |
| 2011/0050562 A1 | 3/2011 | Schoen et al. | |
| 2011/0109577 A1* | 5/2011 | Lee | G06F 3/04883 |
| | | | 345/173 |
| 2011/0292177 A1 | 12/2011 | Sakurai et al. | |
| 2011/0301934 A1 | 12/2011 | Tardif | |
| 2012/0144331 A1 | 6/2012 | Tolonen et al. | |
| 2012/0236031 A1 | 9/2012 | Haddick et al. | |
| 2012/0249416 A1 | 10/2012 | Maciocci et al. | |
| 2013/0016070 A1* | 1/2013 | Starner | G06F 3/0426 |
| | | | 345/175 |
| 2013/0055362 A1 | 2/2013 | Rathbun | |
| 2013/0088455 A1 | 4/2013 | Jeong | |
| 2013/0254695 A1 | 9/2013 | Lambourne et al. | |
| 2014/0053086 A1 | 2/2014 | Kim et al. | |
| 2014/0055343 A1* | 2/2014 | Kim | G06F 3/0304 |
| | | | 345/156 |
| 2014/0115114 A1 | 4/2014 | Garmark et al. | |
| 2014/0171036 A1 | 6/2014 | Simmons | |
| 2014/0201666 A1* | 7/2014 | Bedikian | G06F 3/017 |
| | | | 715/771 |
| 2014/0267189 A1 | 9/2014 | Moll et al. | |
| 2014/0289676 A1* | 9/2014 | Yoritate | G06F 3/04842 |
| | | | 715/830 |
| 2014/0365920 A1 | 12/2014 | Daniels et al. | |
| 2014/0375683 A1 | 12/2014 | Salter et al. | |
| 2015/0009124 A1 | 1/2015 | Antoniac | |
| 2015/0078586 A1* | 3/2015 | Ang | H03G 1/00 |
| | | | 381/109 |
| 2015/0085058 A1 | 3/2015 | Zhang et al. | |
| 2015/0089451 A1 | 3/2015 | Jin et al. | |
| 2015/0103021 A1 | 4/2015 | Lim et al. | |
| 2015/0120293 A1 | 4/2015 | Wohlert et al. | |
| 2015/0186002 A1* | 7/2015 | Suzuki | G06F 3/0482 |
| | | | 715/830 |
| 2015/0187357 A1* | 7/2015 | Xia | G06F 3/005 |
| | | | 704/275 |
| 2015/0271120 A1 | 9/2015 | Langholz | |
| 2015/0287403 A1 | 10/2015 | Holzer Zaslansky et al. | |
| 2015/0309316 A1 | 10/2015 | Osterhout et al. | |
| 2015/0324087 A1 | 11/2015 | Gregory et al. | |
| 2015/0324645 A1 | 11/2015 | Jang et al. | |
| 2015/0370320 A1 | 12/2015 | Connor | |
| 2016/0092035 A1 | 3/2016 | Crocker et al. | |
| 2016/0113550 A1 | 4/2016 | Martin | |
| 2016/0162531 A1 | 6/2016 | Beattie, Jr. et al. | |
| 2016/0189315 A1 | 6/2016 | Anania et al. | |
| 2016/0259517 A1 | 9/2016 | Butcher et al. | |
| 2016/0320853 A1* | 11/2016 | Lien | G06F 3/011 |
| 2017/0046058 A1 | 2/2017 | Karunamuni et al. | |
| 2017/0090747 A1* | 3/2017 | Dash | G06F 1/163 |
| 2017/0097687 A1* | 4/2017 | Pinault | G06V 40/28 |
| 2017/0111723 A1 | 4/2017 | Boesen | |
| 2017/0123487 A1 | 5/2017 | Hazra et al. | |
| 2017/0195736 A1* | 7/2017 | Chai | H04N 21/4622 |
| 2017/0195739 A1* | 7/2017 | Wessel | H04N 21/4882 |
| 2017/0228130 A1* | 8/2017 | Palmaro | G06F 3/0485 |
| 2017/0236197 A1 | 8/2017 | Acken et al. | |
| 2017/0277684 A1 | 9/2017 | Dharmarajan Mary | |
| 2017/0277685 A1 | 9/2017 | Takumi | |
| 2017/0287225 A1 | 10/2017 | Powderly et al. | |
| 2017/0351910 A1 | 12/2017 | Elwazer et al. | |
| 2018/0004392 A1 | 1/2018 | Yang et al. | |
| 2018/0005429 A1 | 1/2018 | Osman et al. | |
| 2018/0046245 A1 | 2/2018 | Schwarz et al. | |
| 2018/0062691 A1 | 3/2018 | Barnett, Jr. | |
| 2018/0067914 A1 | 3/2018 | Chen et al. | |
| 2018/0075658 A1 | 3/2018 | Lanier et al. | |
| 2018/0101986 A1 | 4/2018 | Burns et al. | |
| 2018/0107276 A1 | 4/2018 | Heubel et al. | |
| 2018/0158370 A1 | 6/2018 | Pryor | |
| 2018/0321826 A1 | 11/2018 | Bereza et al. | |
| 2018/0329209 A1* | 11/2018 | Nattukallingal | G02B 27/01 |
| 2018/0335930 A1 | 11/2018 | Scapel et al. | |

(56) References Cited

U.S. PATENT DOCUMENTS

| | | | |
|---|---|---|---|
| 2018/0343023 A1* | 11/2018 | Park | G06F 1/163 |
| 2018/0349690 A1 | 12/2018 | Rhee et al. | |
| 2019/0019508 A1 | 1/2019 | Rochford et al. | |
| 2019/0052587 A1 | 2/2019 | Andreou et al. | |
| 2019/0114802 A1 | 4/2019 | Lazarow | |
| 2019/0146219 A1 | 5/2019 | Rodriguez, II | |
| 2019/0172262 A1 | 6/2019 | Mchugh et al. | |
| 2019/0179405 A1 | 6/2019 | Sun et al. | |
| 2019/0187765 A1 | 6/2019 | Ashwood et al. | |
| 2019/0188918 A1 | 6/2019 | Brewer et al. | |
| 2019/0020501 A1 | 7/2019 | Fujii et al. | |
| 2019/0266405 A1 | 8/2019 | Chang | |
| 2019/0307982 A1 | 10/2019 | Brodsky | |
| 2019/0310757 A1 | 10/2019 | Lee et al. | |
| 2019/0340799 A1 | 11/2019 | Dryer et al. | |
| 2019/0342507 A1 | 11/2019 | Dye et al. | |
| 2019/0362557 A1 | 11/2019 | Lacey et al. | |
| 2019/0369839 A1 | 12/2019 | Yang et al. | |
| 2020/0034033 A1 | 1/2020 | Chaudhri et al. | |
| 2020/0036830 A1 | 1/2020 | Hatanaka et al. | |
| 2020/0042095 A1* | 2/2020 | Ang | G06F 21/32 |
| 2020/0104039 A1 | 4/2020 | Robertson et al. | |
| 2020/0142497 A1* | 5/2020 | Zhu | G06F 1/163 |
| 2020/0201514 A1* | 6/2020 | Murphy | G06F 3/011 |
| 2020/0226814 A1 | 7/2020 | Tang et al. | |
| 2020/0226835 A1 | 7/2020 | Farchy et al. | |
| 2020/0279104 A1 | 9/2020 | Andersen et al. | |
| 2020/0293155 A1 | 9/2020 | Shin | |
| 2020/0301500 A1 | 9/2020 | Wilde et al. | |
| 2020/0301575 A1 | 9/2020 | Lindholm et al. | |
| 2020/0348767 A1 | 11/2020 | Araújo et al. | |
| 2020/0387228 A1 | 12/2020 | Ravasz et al. | |
| 2020/0387286 A1 | 12/2020 | Ravasz et al. | |
| 2020/0387295 A1 | 12/2020 | Schoppe et al. | |
| 2021/0004146 A1 | 1/2021 | Linville et al. | |
| 2021/0011612 A1 | 1/2021 | Dancie et al. | |
| 2021/0012574 A1 | 1/2021 | Fu et al. | |
| 2021/0074016 A1 | 3/2021 | Li et al. | |
| 2021/0157412 A1 | 5/2021 | Katz | |
| 2021/0166732 A1 | 6/2021 | Shaburova et al. | |
| 2021/0174034 A1 | 6/2021 | Retek et al. | |
| 2021/0200324 A1* | 7/2021 | Dogan | G06F 3/017 |
| 2021/0241529 A1 | 8/2021 | Cowburn et al. | |
| 2021/0247849 A1 | 8/2021 | Sokol et al. | |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0334733 A1 | 10/2021 | Peters | |
| 2021/0382564 A1 | 12/2021 | Blachly et al. | |
| 2021/0397000 A1 | 12/2021 | Rodriguez, II | |
| 2021/0405761 A1 | 12/2021 | Canberk | |
| 2021/0405772 A1 | 12/2021 | Canberk et al. | |
| 2022/0188539 A1 | 6/2022 | Chan et al. | |
| 2022/0197027 A1 | 6/2022 | Goodrich et al. | |
| 2022/0197446 A1 | 6/2022 | Goodrich et al. | |
| 2022/0197485 A1 | 6/2022 | Goodrich et al. | |
| 2022/0198603 A1 | 6/2022 | Goodrich et al. | |
| 2022/0206588 A1* | 6/2022 | Canberk | G06V 40/113 |
| 2022/0300730 A1 | 9/2022 | Eirinberg et al. | |
| 2022/0300731 A1 | 9/2022 | Eirinberg et al. | |
| 2022/0301231 A1 | 9/2022 | Eirinberg et al. | |
| 2022/0326781 A1 | 10/2022 | Hwang et al. | |
| 2022/0334649 A1 | 10/2022 | Hwang et al. | |
| 2022/0375174 A1 | 11/2022 | Arya et al. | |
| 2022/0382377 A1* | 12/2022 | Hosseinkhani Loorak | G06V 40/28 |
| 2022/0397989 A1 | 12/2022 | Catalano et al. | |
| 2023/0055634 A1 | 2/2023 | Goodrich et al. | |
| 2023/0067305 A1 | 3/2023 | Assa et al. | |
| 2023/0297161 A1 | 9/2023 | Moll | |
| 2023/0300292 A1 | 9/2023 | Barbosa Da Silva et al. | |
| 2023/0400965 A1 | 12/2023 | Goodrich et al. | |
| 2024/0012549 A1 | 1/2024 | Goodrich et al. | |
| 2024/0198235 A1 | 6/2024 | Kudo et al. | |

FOREIGN PATENT DOCUMENTS

| | | |
|---|---|---|
| CN | 116635771 A | 8/2023 |
| CN | 116670632 A | 8/2023 |
| CN | 116685938 A | 9/2023 |
| CN | 116724286 A | 9/2023 |
| CN | 116802590 A | 9/2023 |
| EP | 3707693 | 9/2020 |
| EP | 4172726 A1 | 5/2023 |
| EP | 4172730 A1 | 5/2023 |
| JP | 2018032329 | 3/2018 |
| KR | 20150051769 | 5/2015 |
| KR | 20220158824 | 12/2022 |
| WO | 2009137419 | 11/2009 |
| WO | WO-2015192117 A1 | 12/2015 |
| WO | 2016168591 | 10/2016 |
| WO | 2019094618 | 5/2019 |
| WO | 2021206578 | 10/2021 |
| WO | 2022005687 | 1/2022 |
| WO | 2022005693 | 1/2022 |
| WO | 2022060549 | 3/2022 |
| WO | 2022066578 | 3/2022 |
| WO | 2022067254 | 3/2022 |
| WO | WO-2022060549 A3 | 4/2022 |
| WO | 2022131784 | 6/2022 |
| WO | 2022132381 | 6/2022 |
| WO | 2022140113 | 6/2022 |
| WO | 2022140117 | 6/2022 |
| WO | 2022140129 | 6/2022 |
| WO | 2022140734 | 6/2022 |
| WO | 2022140739 | 6/2022 |
| WO | 2022146678 | 7/2022 |
| WO | 2022198182 | 9/2022 |
| WO | 2022216784 | 10/2022 |
| WO | 2022225252 | 10/2022 |
| WO | 2022245765 | 11/2022 |
| WO | WO-2023177661 A1 | 9/2023 |

OTHER PUBLICATIONS

"U.S. Appl. No. 17/410,814, Response filed Mar. 30, 2022 to Non Final Office Action dated Jan. 12, 2022", 13 pgs.

"International Application Serial No. PCT/US2021/063307, Invitation to Pay Additional Fees dated Mar. 21, 2022", 12 pgs.

"International Application Serial No. PCT/US2021/063350, International Search Report dated Apr. 5, 2022", 4 pgs.

"International Application Serial No. PCT/US2021/063350, Written Opinion dated Apr. 5, 2022", 5 pgs.

"International Application Serial No. PCT/US2021/063553, International Search Report dated Mar. 18, 2022", 4 pgs.

"International Application Serial No. PCT/US2021/063553, Written Opinion dated Mar. 18, 2022", 8 pgs.

"International Application Serial No. PCT/US2021/072864, International Search Report dated Mar. 29, 2022", 4 pgs.

"International Application Serial No. PCT/US2021/072864, Written Opinion dated Mar. 29, 2022", 7 pgs.

"International Application Serial No. PCT/US2021/072959, International Search Report dated Apr. 5, 2022", 5 pgs.

"International Application Serial No. PCT/US2021/072959, Written Opinion dated Apr. 5, 2022", 7 pgs.

"Skype for Business User Guide", Information Services, Heriot-Watt University, UK, [Online] Retrieved from the Internet: <URL:https://www.hw.ac.uk/services/docs/is/skypeforbusinessuserguidev2.0.pdf>, [retrieved on Apr. 12, 2022], (2019), 16 pgs.

U.S. Appl. No. 17/445,767, filed Aug. 24, 2021, Recentering AR/VR Content on an Eyewear Device.

U.S. Appl. No. 17/445,772, filed Aug. 24, 2021, Conversation Interface on an Eyewear Device.

U.S. Appl. No. 17/445,774, filed Aug. 24, 2021, 3D Painting on an Eyewear Device.

U.S. Appl. No. 17/410,814, filed Aug. 24, 2021, Media Content Player on an Eyewear Device.

U.S. Appl. No. 17/655,125, filed Mar. 16, 2022, Augmented Reality Visual or Acoustic Feedback.

(56) References Cited

OTHER PUBLICATIONS

"U.S. Appl. No. 17/410,814, Final Office Action dated Jun. 7, 2022", 21 pgs.
"International Application Serial No. PCT/US2021/063307, International Search Report dated May 12, 2022", 6 pgs.
"International Application Serial No. PCT/US2021/063307, Written Opinion dated May 12, 2022", 10 pgs.
"U.S. Appl. No. 17/445,772, Non Final Office Action dated Jun. 17, 2022", 38 pgs.
"U.S. Appl. No. 17/445,774, Non Final Office Action dated Jul. 13, 2022", 26 pgs.
"U.S. Appl. No. 17/410,814, Response filed Aug. 5, 2022 to Final Office Action dated Jun. 7, 2022", 11 pgs.
"U.S. Appl. No. 17/410,814, Advisory Action dated Aug. 30, 2022", 4 pgs.
"U.S. Appl. No. 17/410,814, Non Final Office Action dated Oct. 3, 2022", 21 pgs.
"U.S. Appl. No. 17/445,767, Non Final Office Action dated Sep. 9, 2022", 25 pgs.
"U.S. Appl. No. 17/445,772, Response filed Sep. 16, 2022 to Non Final Office Action dated Jun. 17, 2022", 11 pgs.
"U.S. Appl. No. 17/445,774, Response filed Oct. 12, 2022 to Non Final Office Action dated Jul. 13, 2022", 12 pgs.
"U.S. Appl. No. 17/655,125, Non Final Office Action dated Nov. 8, 2022", 20 pgs.
"U.S. Appl. No. 17/445,772, Final Office Action dated Dec. 1, 2022", 42 pgs.
"U.S. Appl. No. 17/445,767, Response filed Dec. 7, 2022 to Non Final Office Action dated Sep. 9, 2022", 11 pgs.
"U.S. Appl. No. 17/445,774, Final Office Action dated Dec. 22, 2022", 29 pgs.
U.S. Appl. No. 18/471,056, filed Sep. 20, 2023, 3D Painting on an Eyewear Device.
U.S. Appl. No. 18/456,286, filed Aug. 25, 2023, Media Content Player on an Eyewear Device.
"U.S. Appl. No. 17/410,814, Response filed Apr. 6, 2023 to Final Office Action mailed Feb. 8, 2023", Response to Final Office Action, 13 pgs.
"U.S. Appl. No. 17/410,814, Advisory Action mailed Apr. 17, 2023", 5 pgs.
"U.S. Appl. No. 17/410,814, Response filed Apr. 19, 2023 to Advisory Action mailed Apr. 17, 2023", 13 pgs.
"U.S. Appl. No. 17/655,125, Final Office Action mailed Apr. 25, 2023", 21 pgs.
"U.S. Appl. No. 17/410,814, Notice of Allowance mailed May 25, 2023", 11 pgs.
"U.S. Appl. No. 17/445,767, Non Final Office Action mailed Jun. 1, 2023", 25 pgs.
"U.S. Appl. No. 17/445,772, Response filed Jun. 9, 2023 to Non Final Office Action mailed Mar. 10, 2023", 14 pgs.
"U.S. Appl. No. 17/445,774, Notice of Allowance mailed Jun. 22, 2023", 20 pgs.
"U.S. Appl. No. 17/410,814, Supplemental Notice of Allowability mailed Jun. 29, 2023", 8 pgs.
"U.S. Appl. No. 17/655,125, Response filed Jun. 29, 2023 to Final Office Action mailed Apr. 25, 2023", 11 pgs.
"U.S. Appl. No. 17/445,774, Corrected Notice of Allowability mailed Jul. 6, 2023", 2 pgs.
"International Application Serial No. PCT/US2021/072864, International Preliminary Report on Patentability mailed Jul. 6, 2023", 9 pgs.
"International Application Serial No. PCT/US2021/063307, International Preliminary Report on Patentability mailed Jul. 6, 2023", 12 pgs.
"International Application Serial No. PCT/US2021/063350, International Preliminary Report on Patentability mailed Jul. 6, 2023", 7 pgs.
"International Application Serial No. PCT/US2021/063553, International Preliminary Report on Patentability mailed Jul. 6, 2023", 10 pgs.
"International Application Serial No. PCT/US2021/072959, International Preliminary Report on Patentability mailed Jul. 6, 2023", 9 pgs.
"U.S. Appl. No. 17/655,125, Non Final Office Action mailed Jul. 24, 2023", 22 pgs.
"International Application Serial No. PCT/US2023/015179, International Search Report mailed Aug. 21, 2023", 4 pgs.
"International Application Serial No. PCT/US2023/015179, Written Opinion mailed Aug. 21, 2023", 4 pgs.
"U.S. Appl. No. 17/410,814, 312 Amendment filed Aug. 25, 2023", 3 pgs.
"U.S. Appl. No. 17/445,767, Final Office Action mailed Sep. 13, 2023", 30 pgs.
"U.S. Appl. No. 17/445,767, Response filed Sep. 1, 2023 to Non Final Office Action mailed Jun. 1, 2023", 13 pgs.
"U.S. Appl. No. 17/445,772, Final Office Action mailed Sep. 22, 2023", 46 pgs.
"U.S. Appl. No. 17/655,125, Response filed Oct. 24, 2023 to Non Final Office Action mailed Jul. 24, 2023", 11 pgs.
"U.S. Appl. No. 17/410,814, Response filed Dec. 30, 2022 to Non Final Office Action mailed Oct. 3, 2022", 11 pgs.
"U.S. Appl. No. 17/445,772, Response filed Jan. 31, 2023 to Final Office Action mailed Dec. 1, 2022", 12 pgs.
"U.S. Appl. No. 17/410,814, Final Office Action mailed Feb. 8, 2023", 24 pgs.
"U.S. Appl. No. 17/445,767, Final Office Action mailed Feb. 9, 2023", 26 pgs.
"U.S. Appl. No. 17/445,772, Advisory Action mailed Feb. 10, 2023", 3 pgs.
"U.S. Appl. No. 17/655,125, Response filed Feb. 8, 2023 to Non Final Office Action mailed Nov. 8, 2022", 12 pgs.
"U.S. Appl. No. 17/445,774, Response filed Feb. 22, 2023 to Final Office Action mailed Dec. 22, 2022", 10 pgs.
"U.S. Appl. No. 17/445,767, Response filed Mar. 7, 2023 to Non Final Office Action mailed Sep. 9, 2022", 10 pgs.
"U.S. Appl. No. 17/445,774, Advisory Action mailed Mar. 9, 2023", 6 pgs.
"U.S. Appl. No. 17/445,772, Non Final Office Action mailed Mar. 10, 2023", 36 pgs.
"U.S. Appl. No. 17/445,767, Advisory Action mailed Mar. 17, 2023", 2 pgs.
Wang, Wallace, "Mac OS X for Absolute Beginners", Apress, (2016), 507 pgs.
"U.S. Appl. No. 17/301,284, Corrected Notice of Allowability mailed Jun. 2, 2022", 2 pgs.
"U.S. Appl. No. 17/301,284, Corrected Notice of Allowability mailed Aug. 23, 2022", 2 pgs.
"U.S. Appl. No. 17/301,284, Non Final Office Action mailed Dec. 14, 2021", 27 pgs.
"U.S. Appl. No. 17/301,284, Notice of Allowance mailed May 20, 2022", 8 pgs.
"U.S. Appl. No. 17/301,284, Response filed Mar. 14, 2022 to Non Final Office Action mailed Dec. 14, 2021", 10 pgs.
"U.S. Appl. No. 17/445,772, Advisory Action mailed Nov. 17, 2023", 3 pgs.
"U.S. Appl. No. 17/445,772, Non Final Office Action mailed Jan. 10, 2024", 45 pgs.
"U.S. Appl. No. 17/445,772, Response filed Nov. 8, 2023 to Final Office Action mailed Sep. 22, 2023", 13 pgs.
"U.S. Appl. No. 17/655,125, Final Office Action mailed Nov. 15, 2023", 23 pgs.
"U.S. Appl. No. 17/821,741, Corrected Notice of Allowability mailed Aug. 11, 2023", 2 pgs.
"U.S. Appl. No. 17/821,741, Non Final Office Action mailed Mar. 8, 2023", 15 pgs.
"U.S. Appl. No. 17/821,741, Notice of Allowance mailed Jul. 28, 2023", 8 pgs.
"U.S. Appl. No. 17/821,741, Response filed Jun. 8, 2023 to Non Final Office Action mailed Mar. 8, 2023", 12 pgs.

\* cited by examiner

GESTURE CONTROL ON AN EYEWEAR DEVICE

CLAIM OF PRIORITY

This application claims the benefit of priority to U.S. Provisional Application Ser. No. 63/129,323, filed Dec. 22, 2020, which is incorporated herein by reference in its entirety.

FIELD OF USE

This disclosure relates to eyewear devices.

BACKGROUND

Some electronics-enabled eyewear devices, such as so-called smart glasses, allow users to interact with virtual content while a user is engaged in some activity. Users wear the eyewear devices and can view a real-world environment through the eyewear devices while interacting with virtual content that is displayed by the eyewear devices.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
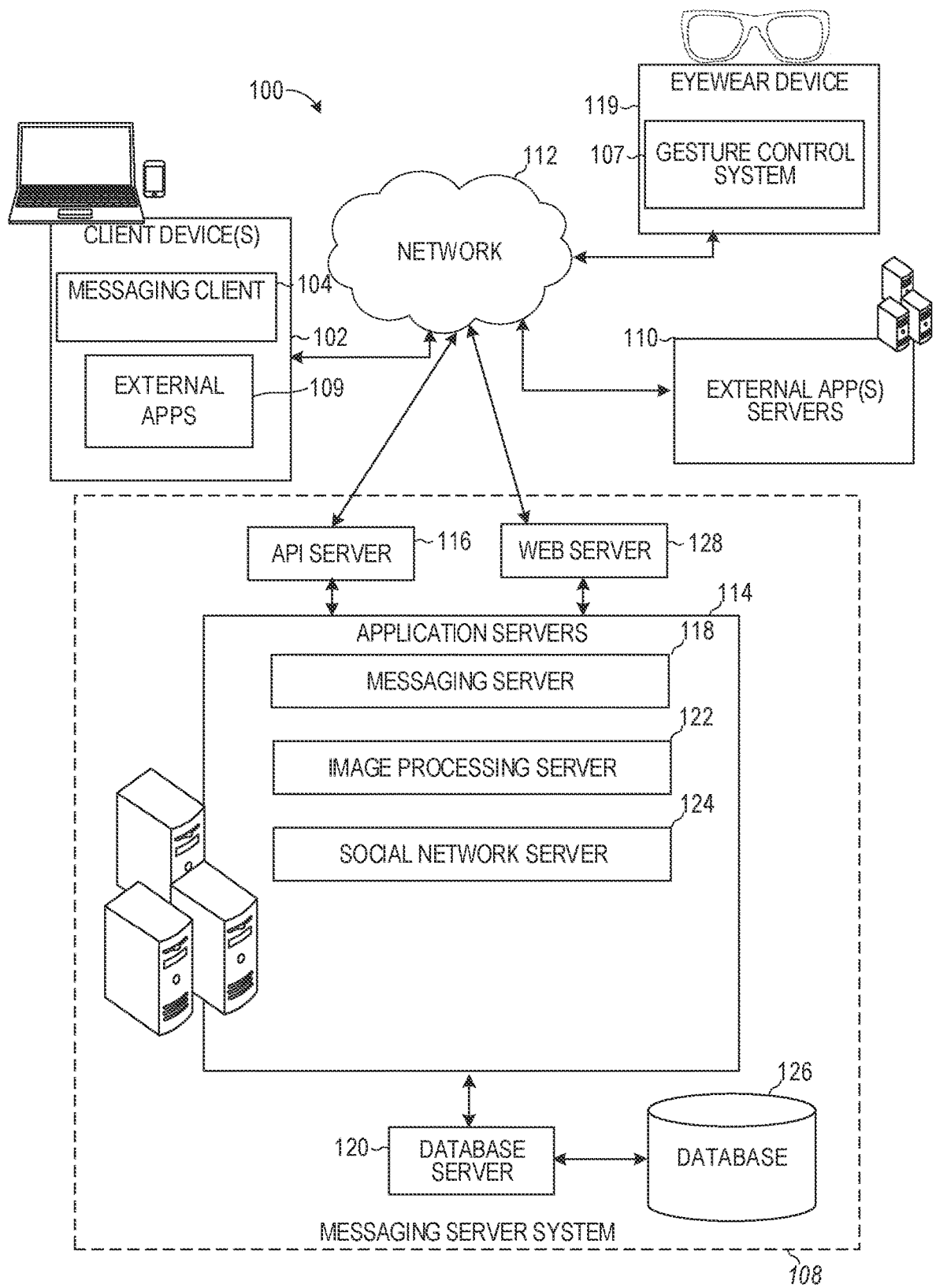
FIG. 1 is a diagrammatic representation of a networked environment in which the present disclosure may be deployed, in accordance with some examples.

The description that follows discusses illustrative embodiments of the disclosure. In the following description, for the purposes of explanation, numerous specific details are set forth in order to provide an understanding of various embodiments of the disclosed subject matter. It will he evident, however, to those skilled in the art, that embodiments of the disclosed subject matter may be practiced without these specific details. In general, well-known instruction instances, protocols, structures, and techniques are not necessarily shown in detail.

Typical smart glass platforms allow users to read their text messages within the smart glasses as well as interact with other types of virtual content. Such platforms are configured to display the virtual content in the lenses of the smart glasses. While such systems work well to generally allow users to interact with virtual content, such devices fail to provide an intuitive interface for navigating through the virtual content. Some systems allow a user to use a touch interface to control the virtual content by touching a touch input interface. However, the size of the touch interface is constrained by the physical layout of the smart glasses which limits the type and manner of touch inputs a user can use to control the content. Users typically encounter a steep learning curve for navigating content using the touch interface because of the limited size of the touch interface. This, in turn, ends up frustrating the users which makes users unwilling to consume content using the smart glasses.

In addition, the typical way of presenting and navigating through the virtual content in the lenses of the smart glasses ends up consuming a great deal of processing and battery resources. This is because such devices use standard, resource-intensive programming languages and operations to process the virtual content and further use additional resources to generate such virtual content for display. As a result, the battery life of these typical smart glasses is very limited, requiring a user to constantly charge the smart glasses for use, which takes away from the appeal and interest of using the smart glasses.

The disclosed embodiments improve the efficiency of using the electronic device by enabling a user to navigate through virtual content using intuitive hand gestures. For example, the disclosed embodiments can detect a user's hand, using a camera of the eyewear device and can detect movement of the fingers on the hand. Based on the placement of the fingers relative to the virtual content and based on how the fingers move relative to each other, the disclosed embodiments control the display of the virtual content. Specifically, the disclosed embodiments display one or more virtual objects on an eyewear device and detect, by a camera of the eyewear device, a hand within view of the eyewear device. The disclosed embodiments determine that a first finger of the hand is oriented along a same direction as the one or more virtual objects that are displayed and detect movement of a second finger of the hand relative to the first finger. The disclosed embodiments control the display of the one or more virtual objects in response to detecting movement of the second finger to the first finger.

As an example, the disclosed embodiments detect that an index finger is oriented along a same axis/direction as a scroll bar. As the disclosed embodiments detect a thumb being dragged along the length and direction of the index finger, the disclosed embodiments translate that gesture into an instruction to move the scroll bar along the same direction. This results in the virtual content advancing in the direction of the user's thumb which is a way to intuitively control how content is displayed and navigated through.

Because the processor of the eyewear device executes a low-power process to detect gestures made by a user's hand, the battery life of the electronic eyewear device is enhanced. This increases the efficiency, appeal, and utility of electronic eyewear devices.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications 109 using Applications Program Interfaces (APIs). The messaging system 100 includes an eyewear device 119, which hosts a gesture control system 107, among other applications. The eyewear device 119 is communicatively coupled to the client device 102 via the network 112 (which may include via a dedicated short-range communication path, such as a Bluetooth™ or WiFi direct connection).

The gesture control system 107 automatically advances through and navigates through augmented reality or virtual reality content that is displayed by the eyewear device 119 based on hand gestures detected within view of the eyewear device 119. For example, the user or wearer of the eyewear device 119 may initially be looking at a first portion of a real-world environment (e.g., a first room in a house). The gesture control system 107 receives user input (e.g., using a client device 102 or a voice activated or touch activated interface of the eyewear device 119) to launch or access virtual content that includes one or more virtual objects. Specifically, user input can include a request to access a music or video library. In response, the gesture control system 107 obtains a list of thumbnails or visual indicators of the media assets associated with a music or video library and presents the list of thumbnails or visual indicators within view of the first portion of the real-world environment.

In an example, the gesture control system 107 can communicate with an on-board camera of the eyewear device 119 to determine or detect presence of a user's hand within view of the lenses of the eyewear device 119. For example, the camera may continuously or periodically scan real-world objects that are included in one or more images or a real-time video feed of the camera. The gesture control system 107 may determine whether the real-world objects correspond to a human hand. In response to determining that the real-world objects correspond to a human hand, the gesture control system 107 may determine that a user's hand has been detected within view of the lenses of the eyewear device 119.

The gesture control system 107 can then begin analyzing the images of the hand to determine movement of the fingers of the hand. Specifically, the gesture control system 107 can segment the hand into several parts: an index finger, a palm and a thumb. While the disclosed embodiments are described in relation to the index finger, any other finger (other than the thumb) can be used instead or in addition to the index finger. The gesture control system 107 can use a template to match different portions of the hand to the different parts to label and track those individual parts within the images. The gesture control system 107 can identify one or more virtual objects that are currently being displayed within the lenses of the eyewear device 119. The gesture control system 107 determines the orientation of the one or more virtual objects. For example, the gesture control system 107 can determine that a scroll bar and thumbnails representing different media assets are aligned and oriented along an x-axis (e.g., the scroll bar and thumbnails are aligned along the horizontal direction). In some implementations, the gesture control system 107 computes a virtual line connecting two points that lie on the one or more virtual objects.

The gesture control system 107 then identifies the index finger within the images captured by the camera of the eyewear device. The gesture control system 107 determines two points on the index finger (e.g., a start point and an end point of the index finger). The gesture control system 107 draws a virtual line along the two points and compares that line to the orientation of the one or more virtual objects. For example, the gesture control system 107 determines that the line or orientation of the index finger is within a threshold range of the orientation of the one or more virtual objects. Specifically, the index finger may not be perfectly aligned (e.g., the virtual line connecting the two points of the index finger may not be parallel with the orientation of the one or more virtual objects). The gesture control system 107 can measure an angle between the line representing the orientation of the index finger and the line representing the orientation of the virtual objects. The gesture control system 107 can compare the angle to a threshold value (e.g., 15 degrees). In response to determining that the angle is less than the threshold value, the gesture control system 107 can map the orientation of the index finger to the one or more virtual objects. In response to mapping the orientation of the index finger to the virtual objects, the gesture control system 107 can trigger control of the virtual objects (e.g., navigation through the virtual objects and activation of functions relating to the virtual objects) based on gestures of other fingers (e.g., a thumb) relative to the index finger.

In some embodiments, the gesture control system 107, in response to mapping the index finger to the one or more virtual objects, detects a current position of the thumb. The gesture control system 107 maps a current location of the scroll bar to the current position of the thumb. The gesture control system 107 detects movement of the thumb along the direction of the index finger (e.g., the gesture control system 107 detects that the thumb has been dragged along the index finger). In response, the gesture control system 107 moves the scroll bar or advances the one or more objects in the same direction as the thumb. For example, if the gesture control system 107 determines that the thumb has been moved towards the left horizontal direction, the gesture control system 107 moves the scroll bar towards the left by an amount corresponding to the movement of the thumb. For example, if the thumb has been moved 2 centimeters to the left, the gesture control system 107 moves the scroll bar 20 pixels to the left. As the scroll bar is moved to the left by 20 pixels, the virtual content items (e.g., thumbnails of media assets) that are controlled by the scroll bar are navigated to the left. As another example, if the gesture control system 107 determines that the thumb has been moved towards the right horizontal direction, the gesture control system 107 moves the scroll bar towards the right by an amount corresponding to the movement of the thumb. As the scroll bar is moved to the right, the virtual content items (e.g., thumbnails of media assets) that are controlled by the scroll bar are navigated to the right.

In some embodiments, the virtual objects are presented on the eyewear device 119 in a three-dimensional cylindrical carousel arrangement. As the virtual objects are scrolled based on movement of the user's thumb, the virtual objects rotate around the three-dimensional cylindrical carousel to bring other virtual objects into current view and focus.

Conceptually, the user's index finger represents the scroll bar or the virtual content items and the user's thumb represents the cursor associated with the scroll bar. As the thumb is determined to move in a particular direction, the corresponding cursor associated with the scroll bar is moved in a similar manner and magnitude in the same particular direction.

In other embodiments, the scroll bar and thumbnails are aligned along a vertical direction. In such circumstances, the gesture control system 107 can determine that the index finger is pointing up or oriented along the vertical direction. When the gesture control system 107 determines that the thumb is moved up/down along the index finger, the scroll bar and thumbnails are navigated through and advanced up/down.

In some embodiments, first and second sets of virtual content can be simultaneously displayed together in the lenses of the eyewear device 119. The first set of virtual content can be oriented in the horizontal direction and the second set of virtual content can be oriented in the vertical direction. The gesture control system 107 can detect an orientation of the user's index finger relative to the orientation of the first and second virtual content. The gesture control system 107 can measure an angle formed between the index finger and lines that represent the orientation of the first and second virtual content. The gesture control system 107 compares a first angle formed between the index finger and a first line that represents the orientation of the first virtual content with a threshold. The gesture control system 107 compares a second angle formed between the index finger and a second line that represent the orientation of the second virtual content with the threshold. The gesture control system 107 determines that the first angle is less than the threshold and that the second angle is greater than the threshold. In response, the gesture control system 107 maps the index finger to the first set of virtual to control navigation of the first set of content based on movement of the thumb. After navigating through the first set of content, the gesture control system 107 can determine that the orientation of the hand has been changed resulting in the first angle being more than the threshold and the second angle being less than the threshold. In response, the gesture control system 107 switches to map the index finger to the second set of virtual to control navigation of the second set of content based on movement of the thumb instead of the first scat of content.

In some embodiments, the gesture control system 107 identifies a current virtual object that is in focus on the eyewear device 119. For example, the gesture control system 107 determines or identifies a virtual content (e.g., a thumbnail representing a media asset) over which a cursor is currently positioned. The gesture control system 107 detects contact between the thumb and an index finger (e.g., the gesture control system 107 determines that the user taps the index finger with the user's thumb). In response, the gesture control system 107 activates a function associated with the identified virtual content. For example, the gesture control system 107 starts playing, pauses playback or stops playing a media asset associated with and represented by the identified virtual content.

In some embodiments, the gesture control system 107 allows a user to switch between collections of media assets based on movement of the thumb relative to the index finger. For example, the gesture control system 107 determines that the thumb has been moved behind or in front of the index finger (e.g., the thumb has been moved along a direction that is perpendicular to the orientation of the index finger). Specifically, the gesture control system 107 draws a virtual line representing a direction of movement of the thumb. The gesture control system 107 computes an angle formed between the virtual line representing movement of the thumb to the virtual line representing the orientation of the index finger. In response to determining that a difference between the angle and 90 degrees is less than a threshold (e.g., less than 10 degrees), the gesture control system 107 determines that the thumb has been moved in a perpendicular direction relative to the index finger.

The gesture control system 107 can measure the distance of travel representing how much the thumb has been moved in the perpendicular direction. If the distance exceeds a first value and is less than a second value, the gesture control system 107 replaces a current display of a first plurality of virtual objects (e.g., a first set of thumbnails representing media assets in a first collection) associated with a first collection with a second plurality of virtual objects (e.g., a second set of thumbnails representing media assets in a second collection). If the distance exceeds a second value, the gesture control system 107 replaces a current display of a first plurality of virtual objects (e.g., a first set of thumbnails representing media assets in a first collection) associated with a first collection with a third plurality of virtual objects a third set of thumbnails representing media assets in a third collection). The gesture control system 107 can continuously switch presentation of the different collections of virtual objects as the thumb is moved along the perpendicular direction by a given amount. The gesture control system 107 can then determine that the thumb at the current position is moved along the orientation and direction of the index finger. In response, the gesture control system 107 advances through the virtual objects that are part of the collection currently being displayed.

A messaging client 104 is able to communicate and exchange data with other messaging clients 104, the eyewear device 119, and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Image processing server 122 is used to implement scan functionality of the augmentation system 208. Scan functionality includes activating and providing one or more augmented reality experiences on a client device 102 when an image is captured by the client device 102. Specifically, the messaging application 104 on the client device 102 can be used to activate a camera. The camera displays one or more real-time images or a video to a user along with one or more icons or identifiers of one or more augmented reality experiences. The user can select a given one of the identifiers to launch the corresponding augmented reality experience. Launching the augmented reality experience includes obtaining one or more augmented reality items associated with the augmented reality experience and overlaying the augmented reality items on top of the images or video being presented.

Figure 3:
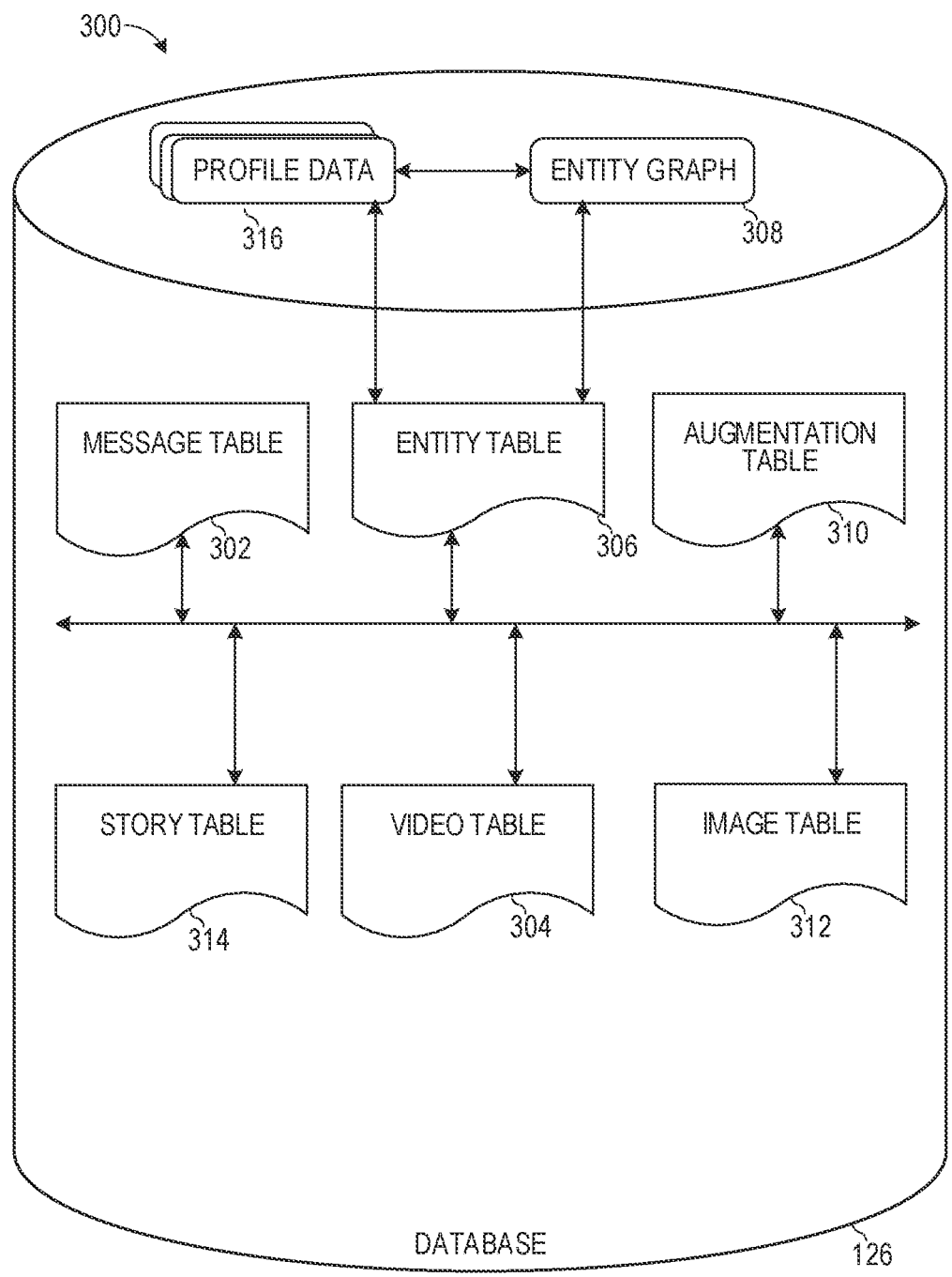
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from a external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

System Architecture

Figure 2:
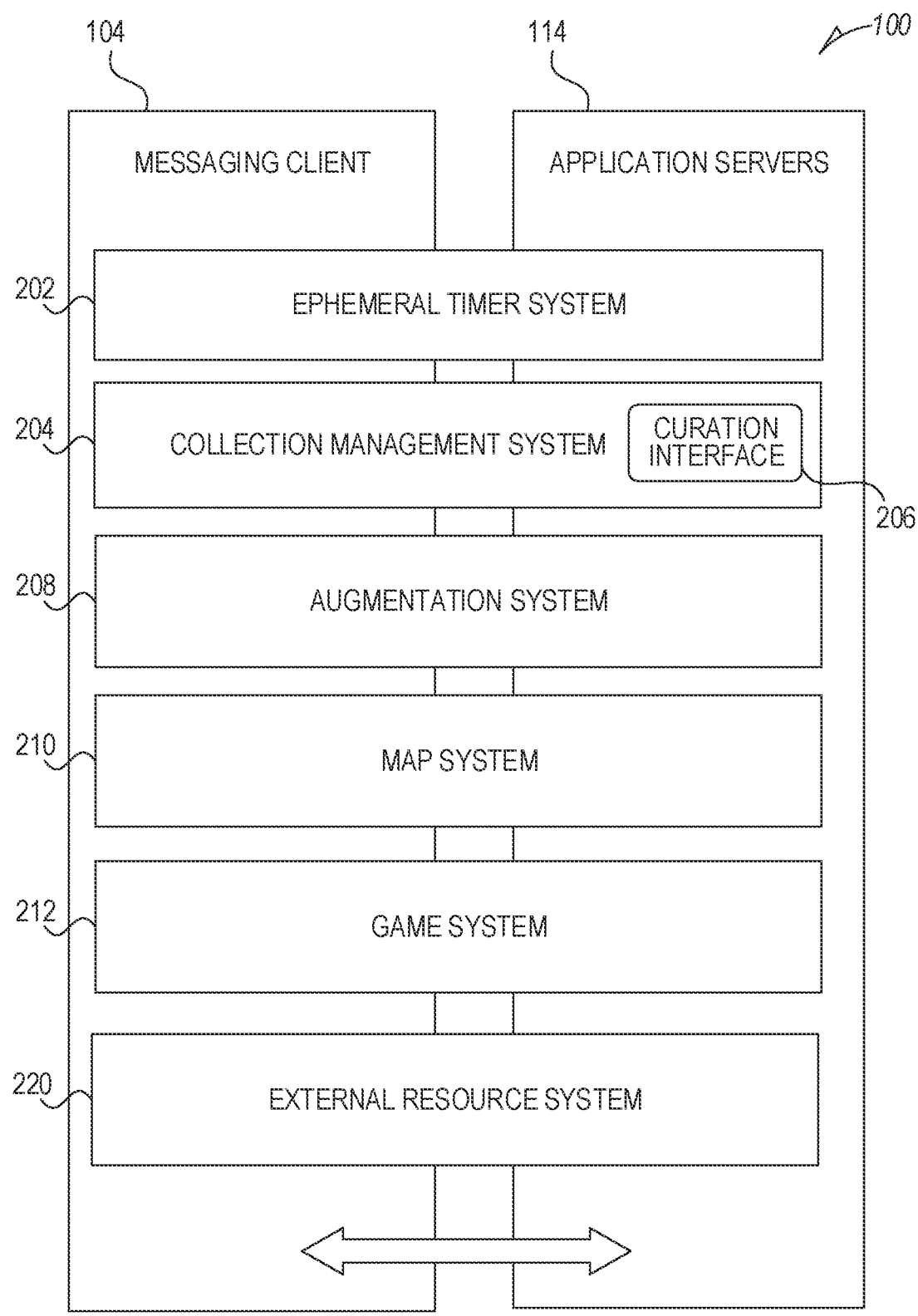
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between a external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
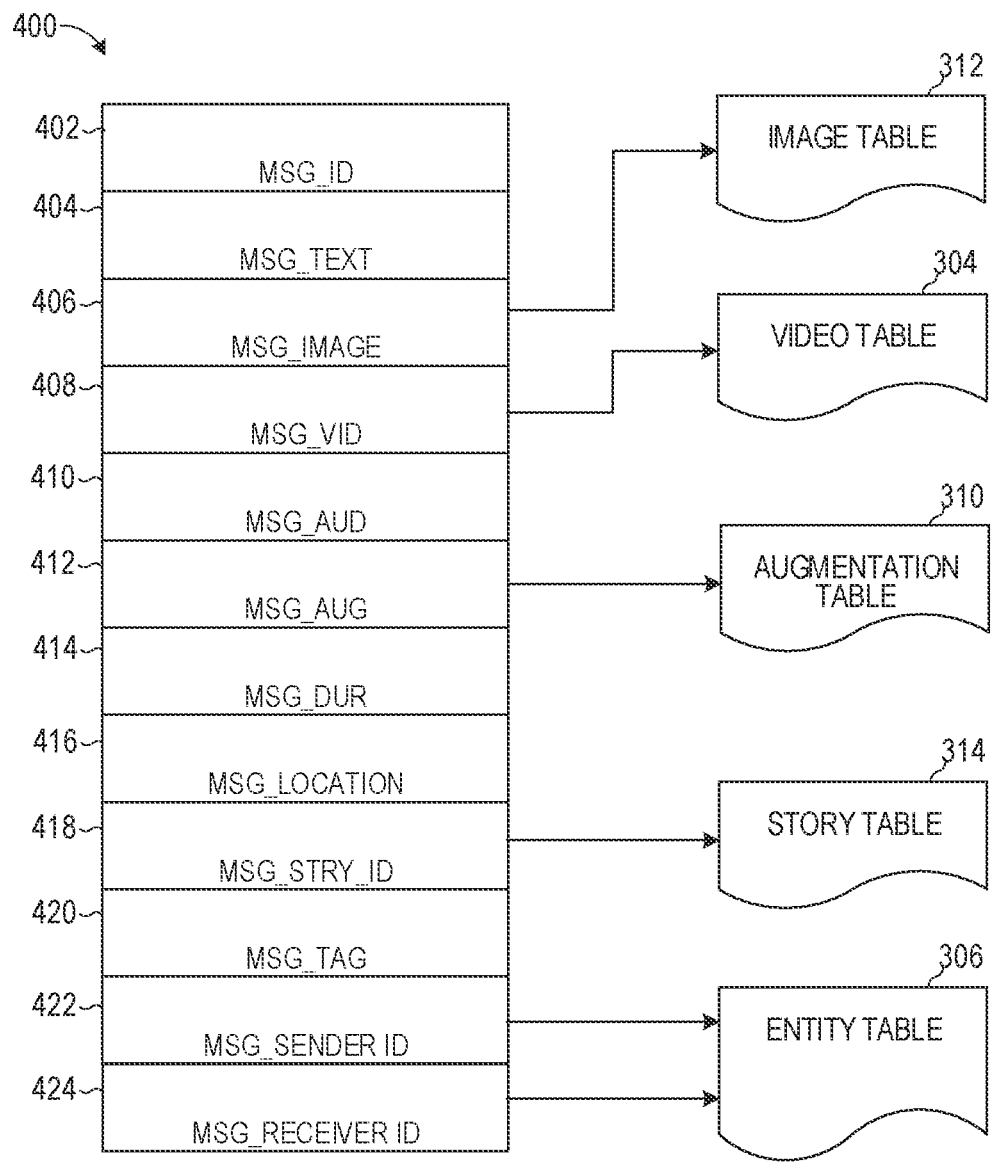
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102. or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a. sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Eyewear Device

Figure 5:
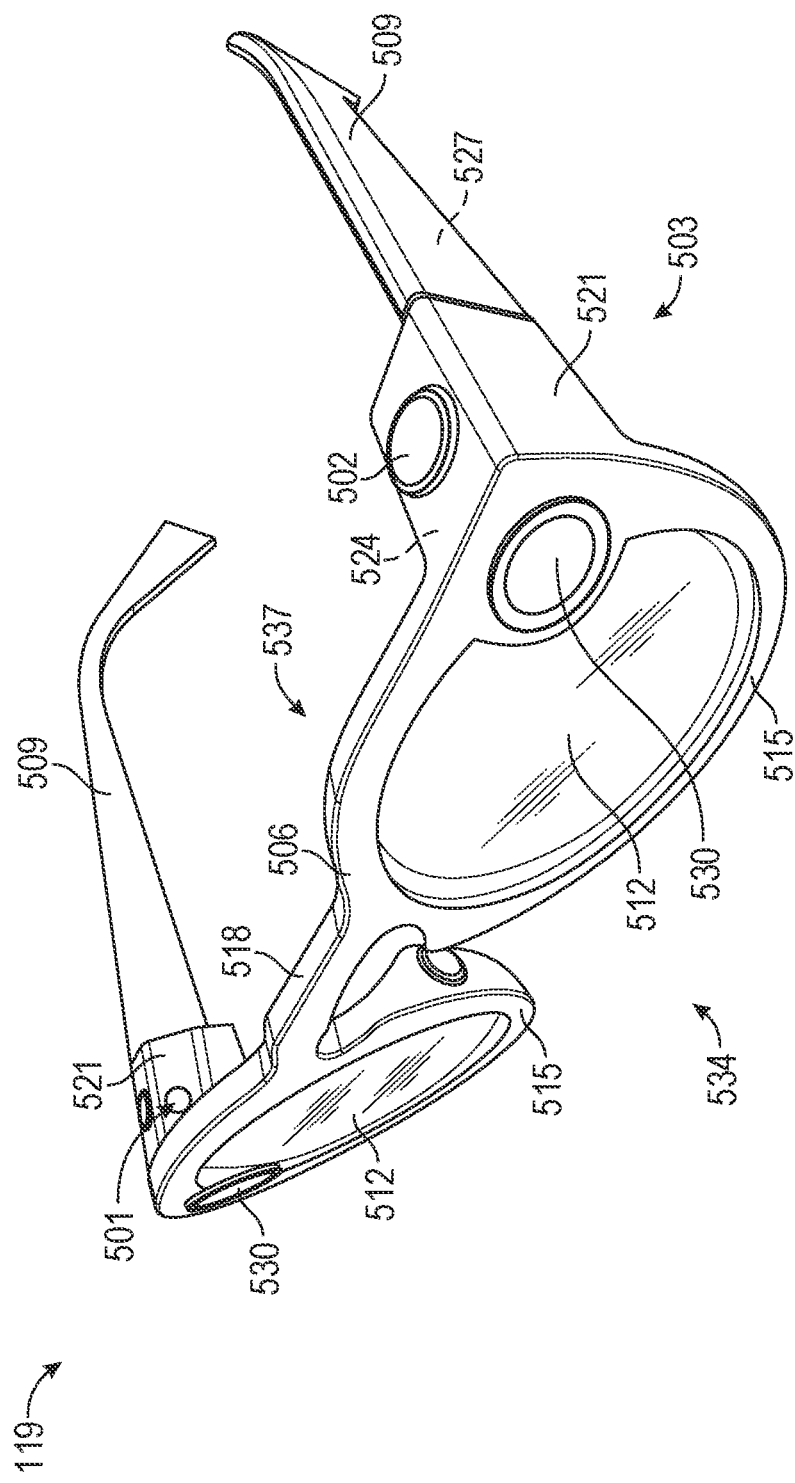
FIG. 5 is a perspective view of an eyewear device according to an example embodiment.

FIG. 5 shows a front perspective view of an eyewear device 119 in the form of a pair of smart glasses that include a gesture control system 107 according to one example embodiment. The eyewear device 119 includes a body 503 comprising a front piece or frame 506 and a pair of temples 509 connected to the frame 506 for supporting the frame 506 in position on a user's face when the eyewear device 119 is worn. The frame 506 can be made from any suitable material such as plastics or metal, including any suitable shape memory alloy.

The eyewear device 119 includes a pair of optical elements in the form of a pair of lenses 512 held by corresponding optical element holders in the form of a pair of rims 515 forming part of the frame 506. The rims 515 are connected by a bridge 518. In other embodiments, one or both of the optical elements can be a display, a display assembly, or a lens and display combination.

The frame 506 includes a pair of end pieces 521 defining lateral end portions of the frame 506. In this example, a variety of electronics components are housed in one or both of the end pieces 521. The temples 509 are coupled to the respective end pieces 521. In this example, the temples 509 are coupled to the frame 506 by respective hinges so as to be hingedly movable between a wearable mode and a collapsed mode in which the temples 509 are pivoted towards the frame 506 to lie substantially flat against it. In other embodiments, the temples 509 can be coupled to the frame 506 by any suitable means, or can be rigidly or fixedly secured to the frame 506 so as to be integral therewith.

Each of the temples 509 that includes a front portion of that is coupled to the frame 506 and any suitable rear portion for coupling to the ear of the user, such as the curves or cute piece illustrated in the example embodiment of FIG. 5. In some embodiments, the frame 506 is formed of a single piece of material, so as to have a unitary or monolithic construction. In some embodiments, the whole of the body 503 (including both the frame 506 and the temples 509) can be of the unitary or monolithic construction.

The eyewear device 119 has onboard electronics components including a computing device, such as a computer 524, or low power processor, which can in different embodiments be of any suitable type so as to be carried by the body 503. In some embodiments, the computer 524 is at least partially housed in one or both of the temples 509. In the present embodiment, various components of the computer 524 are housed in the lateral end pieces 521 of the frame 506. The computer 524 includes one or more processors with memory (e.g., a volatile storage device, such as random access memory or registers), a storage device (e.g., a non-volatile storage device), wireless communication circuitry (e.g., BLE communication devices and/or WiFi direct devices), and a power source. The computer 524 comprises low-power circuitry, high-speed circuitry, and, in some embodiments, a display processor. Various embodiments may include these elements in different configurations or integrated together in different ways.

The computer 524 additionally includes a battery 527 or other suitable portable power supply. In one embodiment, the battery 527 is disposed in one of the temples 509. In the eyewear device 119 shown in FIG. 5, the battery 527 is shown as being disposed in one of the end pieces 521, being electrically coupled to the remainder of the computer 524 housed in the corresponding end piece 521.

The eyewear device 119 is camera-enabled, in this example comprising a camera 530 mounted in one of the end pieces 521 and facing forwards so as to be aligned more or less with the direction of view of a wearer of the eyewear device 119. The camera 530 is configured to capture digital images (also referred to herein as digital photographs or pictures) as well as digital video content. Operation of the camera 530 is controlled by a camera controller provided by the computer 524, image data representative of images or video captured by the camera 530 being temporarily stored on a memory forming part of the computer 524. In some embodiments, the eyewear device 119 can have a pair of cameras 530, e.g. housed by the respective end pieces 521.

As will be described in greater detail below, the onboard computer 524, camera 530, and the lenses 512 are configured together to provide a gesture control system 107 that automatically navigates through content and activates functions associated with content based on hand gestures that are within view of the lenses 512. Specifically, the lenses 512 can display virtual content or one or more virtual objects. This makes it appear to the user that the virtual content is integrated within a real-world environment that the user views through the lenses 512. In some embodiments, the virtual content is received from the client device 102. In some embodiments, the virtual content is received directly from the application servers 114.

Based on input received by the eyewear device 119 from the camera 530, the eyewear device 119 can control user interaction with the virtual content based on hand gestures of a hand that appears in one or more images captured by the camera 530. In one example, the user interaction can control playback of content that is presented on the lenses 512. In another example, the user interaction can navigate through a playlist or music or video library. In another example, the user interaction can navigate through a conversation the user is involved in, such as by scrolling through various three-dimensional or two-dimensional conversation elements (e.g., chat bubbles) and selecting individual conversation elements to respond to generate messages to transmit to participants of the conversation.

The gesture control system 107 (which can be implemented by the computer 524) determines a current orientation of an index finger relative to an orientation of one or more virtual objects that are presented in the lenses 512. For example, the gesture control system 107 determines that the line or orientation of the index finger is within a threshold range of the orientation of the one or more virtual objects. In response to determining that the line or orientation of the index finger is within a threshold range of the orientation of the one or more virtual objects, the gesture control system 107 can map the orientation of the index finger to the one or more virtual objects. In response to mapping the orientation of the index finger to the virtual objects, the gesture control system 107 can trigger control of the virtual objects (e.g., navigation through the virtual objects and activation of functions relating to the virtual objects) based on gestures of other fingers (e.g., a thumb) relative to the index finger. For example, the gesture control system 107 detects movement of the thumb along the direction of the index finger (e.g., the gesture control system 107 detects that the thumb has been dragged along the index finger). In response, the gesture control system 107 moves the scroll bar or advances the one or more objects in the same direction as the thumb.

The eyewear device 119 further includes one or more communication devices, such as Bluetooth low energy (BLE) communication interface. Such communication interface enables the eyewear device 119 to communicate wirelessly with the client device 102. Other forms of wireless communication can also be employed instead of, or in addition to, the BLE communication interface, such as a WiFi direct interface. The BLE communication interface implements a standard number of BLE communication protocols.

A first of the communications protocols implemented by the BLE interface of the eyewear device 119 enables an unencrypted link to be established between the eyewear device 119 and the client device 102. In this first protocol, the link-layer communication (the physical interface or medium) between the eyewear device 119 and the client device 102 includes unencrypted data. In this first protocol, the application layer (the communication layer operating on the physically exchanged data) encrypts and decrypts data that is physically exchanged in unencrypted form over the link layer of the BLE communication interface. In this way, data exchanged over the physical layer can freely be read by an eavesdropping device, but the eavesdropping device will not be able to decipher the data that is exchanged without performing a decryption operation in the application layer.

A second of the communications protocols implemented by the BLE interface of the eyewear device 119 enables an encrypted link to be established between the eyewear device 119 and the client device 102. In this second protocol, the link-layer communication (the physical interface) between the eyewear device 119 and the client device 102 receives data from the application layer and adds a first type of encryption to the data before exchanging the data over the physical medium. In this second protocol, the application layer (the communication layer operating on the physically exchanged data) may or may not use a second type of encryption to encrypt and decrypt data that is physically exchanged in encrypted form, using the first type of encryption, over the link layer of the BLE communication interface. Namely, data can be first encrypted by the application layer and then be further encrypted by the physical layer before being exchanged over the physical medium. Following the exchange over the physical medium, the data is then decrypted by the physical layer and then decrypted again (e.g., using a different type of encryption) by the application layer. In this way, data exchanged over the physical layer cannot be read by an eavesdropping device as the data is encrypted in the physical medium.

In some embodiments, the client device 102 communicates with the eyewear device 119 using the first protocol to exchange images or videos or virtual content between the messaging client 104 and the eyewear device 119.

Gesture Control System

Figure 6:
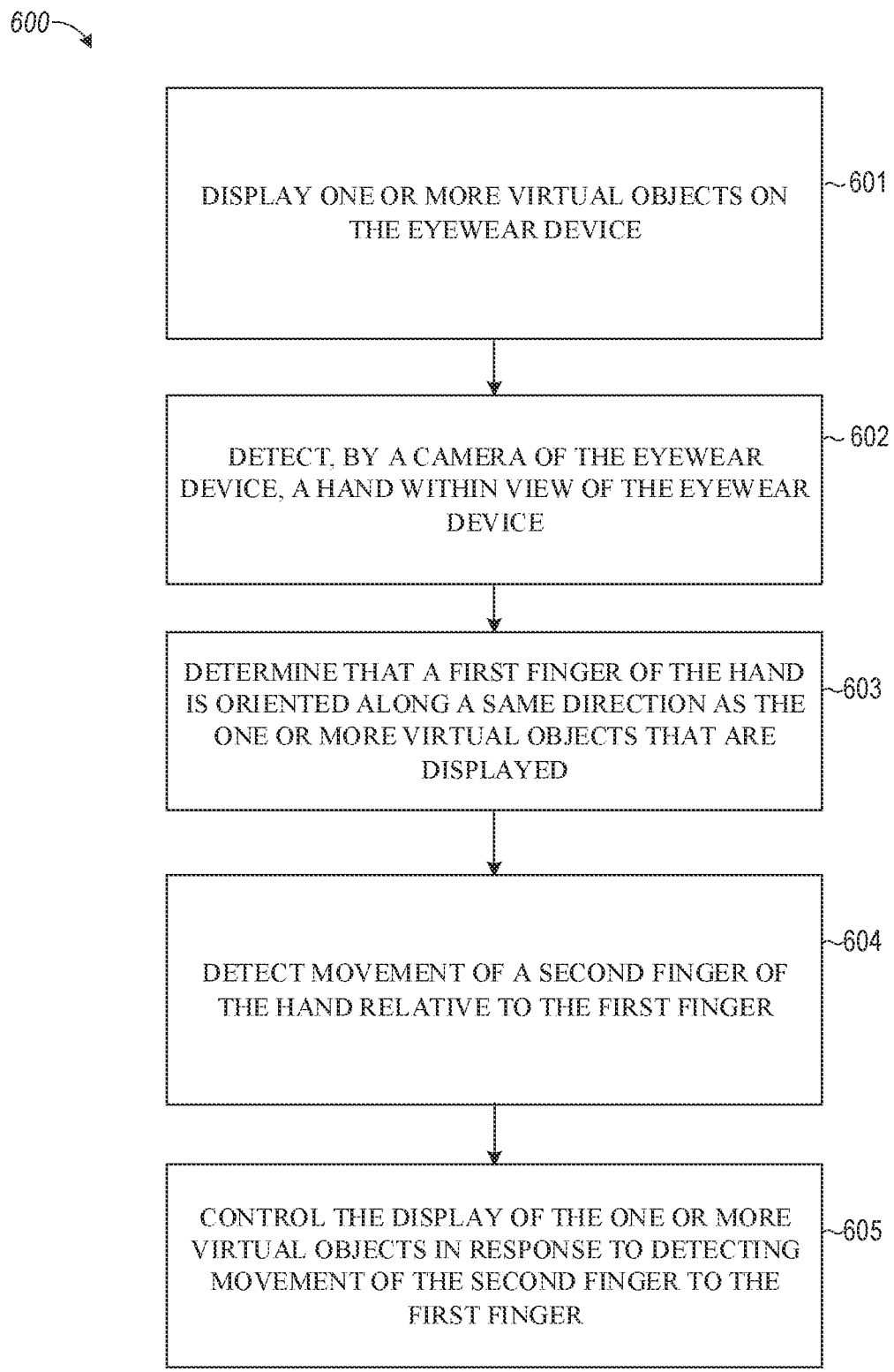
FIG. 6 is a flowchart showing example operations of the gesture control system according to an example embodiment.

FIG. 6 is a flowchart illustrating example operations of the gesture control system 107 in performing a process 600, according to example embodiments. The process 600 may be embodied in computer-readable instructions for execution by one or more processors such that the operations of the process 600 may be performed in part or in whole by the functional components of the gesture control system 107; accordingly, the process 600 is described below by way of example with reference thereto. However, in other embodiments, at least some of the operations of the process 600 may be deployed on various other hardware configurations. The process 600 is therefore not intended to be limited to the gesture control system 107 and can be implemented in whole, or in part, by any other component. Some or all of the operations of process 600 can be in parallel, out of order, or entirely omitted.

At operation 601, the gesture control system 107 displays one or more virtual objects on an eyewear device. For example, the gesture control system 107 displays a list of thumbnails representing different media assets in the lenses 512 of the eyewear device 119 while the eyewear device 119 is pointing towards a first room in an environment.

At operation 602, the gesture control system 107 detects, by a camera of the eyewear device, a hand within view of the eyewear device. For example, the gesture control system 107 can communicate with an on-board camera of the eyewear device 119 to determine or detect presence of a user's hand within view of the lenses of the eyewear device 119. For example, the camera may continuously or periodically scan real-world objects that are included in one or more images or a real-time video feed of the camera. The camera may determine whether the real-world objects correspond to a human hand, such as using known image recognition techniques. In response, the camera may indicate to the gesture control system 107 that a user's hand has been detected within view of the lenses of the eyewear device 119.

At operation 603, the gesture control system 107 determines that a first finger of the hand is oriented along a same direction as the one or more virtual objects that are displayed. For example, the gesture control system 107 determines two points on the index finger (e.g., a start point and an end point of the index finger). The gesture control system 107 draws a virtual line along the two points and compares that line to the orientation of the one or more virtual objects. The gesture control system 107 determines that the line or orientation of the index finger is within a threshold range of the orientation of the one or more virtual objects by, for example, measuring an angle between the line representing the orientation of the index finger and the line representing the orientation of the virtual objects and comparing the angle to a threshold value (e.g., 15 degrees). In response to determining that the angle is less than the threshold value, the gesture control system 107 can map the orientation of the index finger to the one or more virtual objects.

At operation 604, the gesture control system 107 detects movement of a second finger of the hand relative to the first finger. For example, the gesture control system 107 detects movement of the thumb along the direction of the index finger (e.g., the gesture control system 107 detects that the thumb has been dragged along the index finger). In response, the gesture control system 107 moves the scroll bar or advances the one or more objects in the same direction as the thumb. As another example, the gesture control system 107 detects contact between the thumb and an index finger (e.g., the gesture control system 107 determines that the user taps the index finger with the user's thumb). In response, the gesture control system 107 activates a function associated with a virtual content item currently in focus (currently highlighted by a cursor).

At operation 605, the gesture control system 107 controls the display of the one or more virtual objects in response to detecting movement of the second finger to the first finger. For example, the gesture control system 107 moves a scroll bar or advances the one or more objects in the same direction as the thumb. As another example, the gesture control system 107 starts playing, pauses playback or stops playing a media asset associated with and represented by an identified virtual content item in response to detecting contact between the thumb and an index finger.

Figure 7:
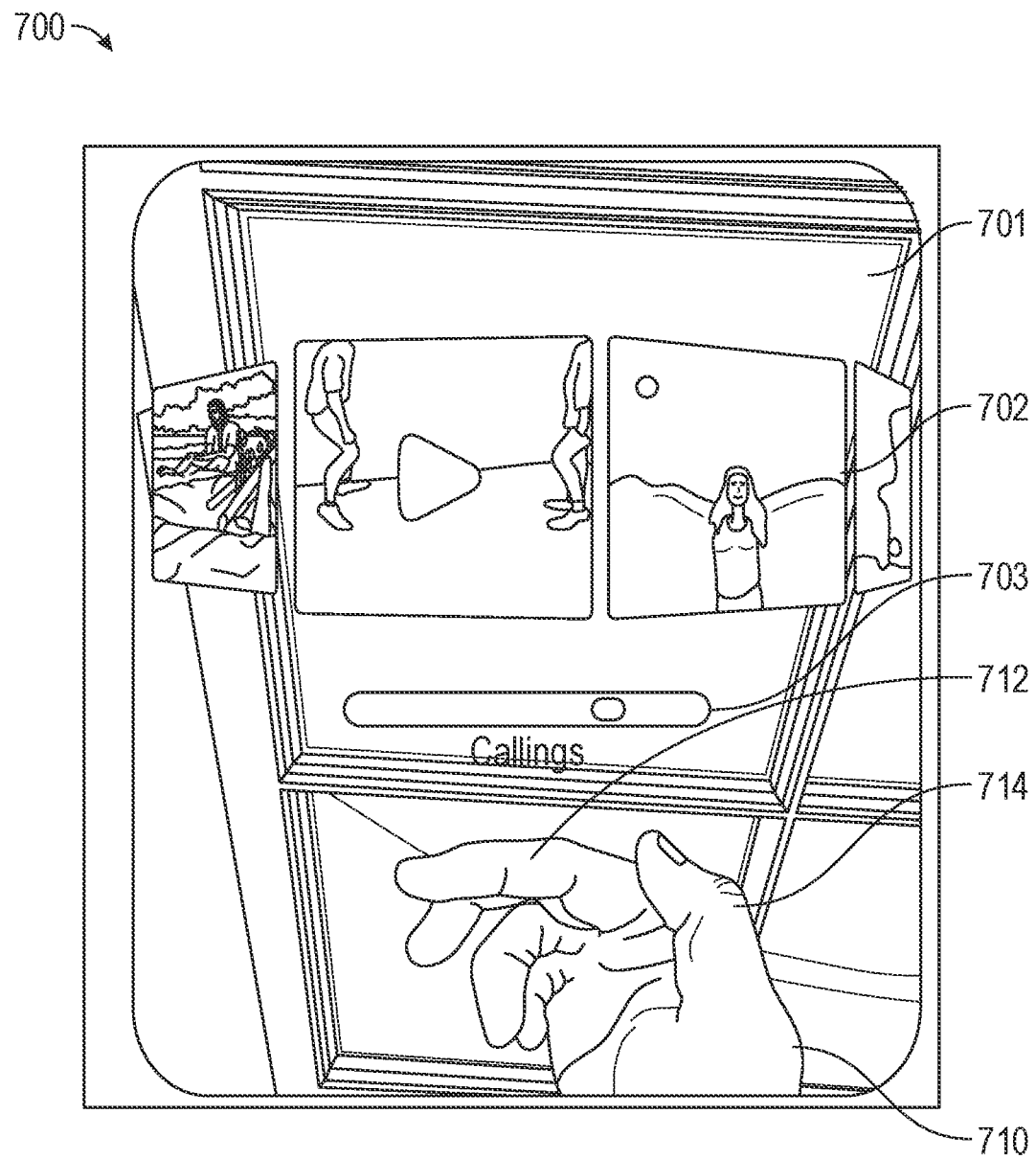
FIGS. 7-9 are illustrative screens of the gesture control system according to example embodiments.
Figure 8:
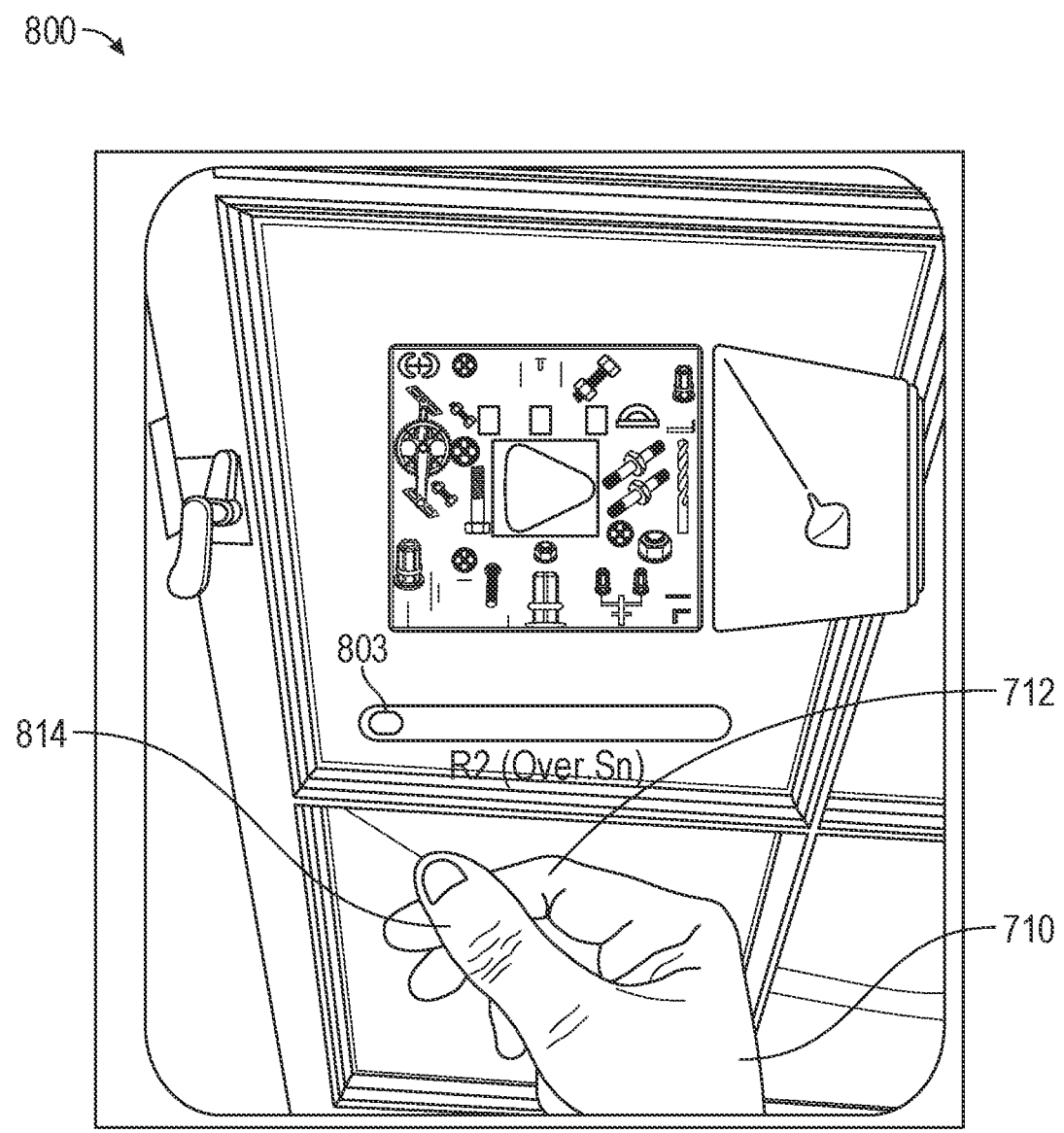
Figure 9:
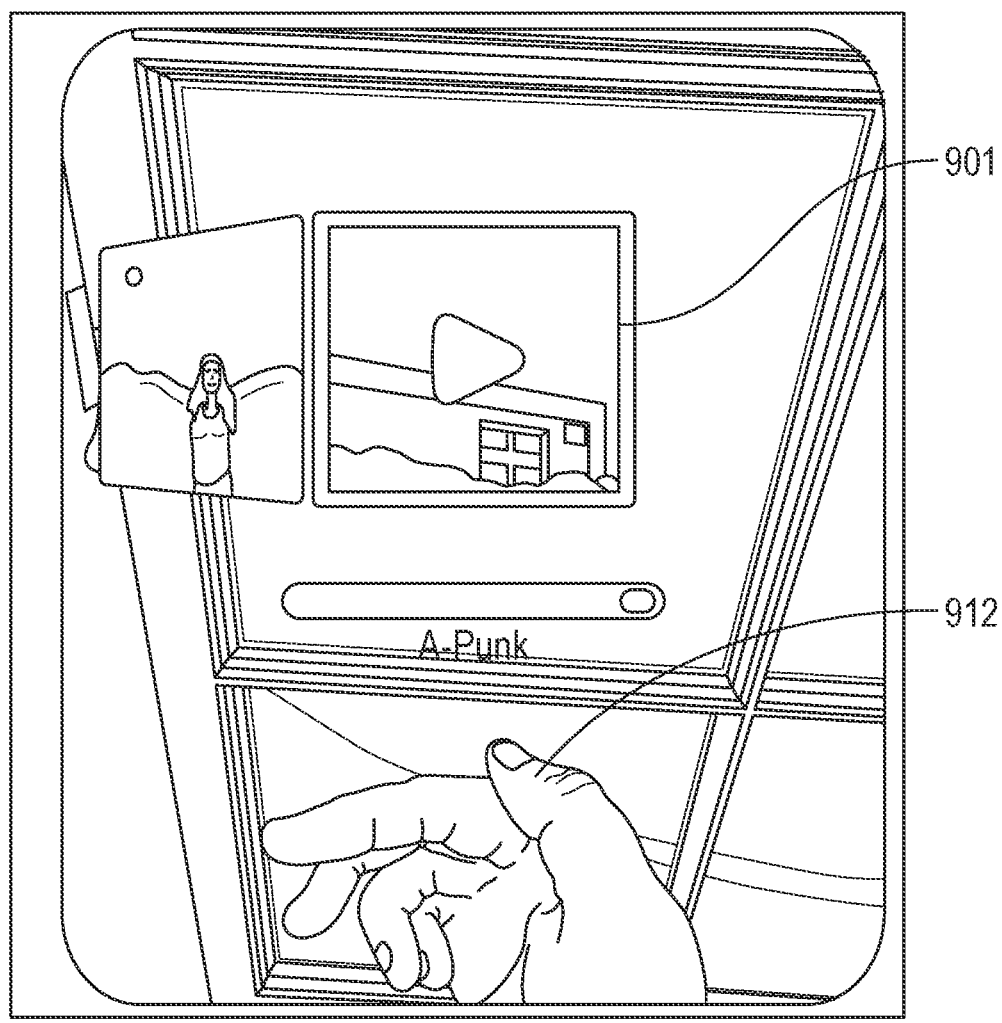

FIGS. 7-9 are illustrative screens of a graphical user interface of the gesture control system 107 according to example embodiments. The screens shown in FIGS. 7-9 may be provided by the messaging client 104 of one or more client devices 102, other applications implemented on one or more client devices 102, or the eyewear device 119.

For example, the screen 700 of FIG. 7 shows a view of a first portion of a real-world environment 701 through the lenses 512 of the eyewear device 112. The eyewear device 112 may receive input from the user that requests to view a list of thumbnails representing a music or video library. In response, the eyewear device 112 obtains from the client device 102 and/or from the application servers 114 one or more virtual objects 702. The virtual objects 702 include thumbnails (e.g., cover arts) representing different media assets (e.g., different songs or videos). The eyewear device 112 displays the virtual objects 702 as three-dimensional objects in a center of the lenses 512 and in a three-dimensional cylindrical carousel arrangement. The eyewear device 112 also displays a scroll bar oriented along the same direction as the virtual objects 702. The eyewear device 112 also displays a title of a current virtual object or thumbnail that is in focus. This makes it appear to the user viewing the first portion of the real-world environment 701 through the lenses 512 as if the virtual objects 702 and scroll bar are within the first portion of the real-world environment 701.

The eyewear device 112 processes images captured by a camera of the eyewear device 112. The eyewear device 112 detects presence of a real-world hand 710 in the images captured by the camera. The eyewear device 112 identifies an index finger 712 and a thumb 714 of the hand. The eyewear device 112 determines the orientation of the virtual objects 702 and the scroll bar 703. For example, the eyewear device 112 determines that the virtual objects 702 and the scroll bar 703 are oriented along a horizontal direction. The eyewear device 112 determines that the orientation of the index finger 712 corresponds to (is aligned with or is within a threshold degree of alignment) the scroll bar 703. In response, the eyewear device 112 maps the index finger 712 to the scroll bar 703 to enable the user to navigate through the virtual objects 702 associated with the scroll bar 703.

For example, the eyewear device 112 maps a current position of the thumb 714 to a current position of the cursor of the scroll bar 703. As the eyewear device 112 detects movement of the thumb along the direction and orientation of the scroll bar 703 and the index finger 712, the eyewear device 112 advances the carousel of virtual objects 702 in the same direction. For example, as shown in screen 800 (FIG. 8), the eyewear device 112 determines that the thumb 814 has been moved to the left by a given amount. In response, the eyewear device 112 navigates the virtual objects 702 to the left by rotating the carousel to the right (e.g., rotating the carousel in a direction opposite the direction of the movement of the thumb). The eyewear device 112 represents this scrolling operation by moving the cursor of the scroll bar 703 from a first position shown in FIG. 7 to a second position 803 shown in FIG. 8.

In a similar manner, the eyewear device 112 can scroll the virtual objects to the right in response to detecting movement of the thumb along the right direction. For example, as shown in screen 900 (FIG. 9), the eyewear device 112 determines that the thumb 814 has been moved to the right by a given amount. In response, the eyewear device 112 navigates the virtual objects 702 to the right by rotating the carousel to the left. The eyewear device 112 represents this scrolling operation by moving the cursor of the scroll bar 703 from a first position shown in FIG. 7 to a third position shown in FIG. 9.

As the thumb moves in a given direction, the virtual objects 702 are rotated. The rate and speed at which the virtual objects 702 are rotated around the carousel and scrolled corresponds to the rate and speed at which the thumb is moved. For example, if the eyewear device 112 determines that the thumb slides or is dragged along the direction of the index finger at a first rate or speed, the eyewear device 112 advances the cursor of the scroll bar and rotates the virtual objects 702 at a first rate or speed which matches or corresponds to the rate or speed of the thumb movement. If the eyewear device 112 determines that the thumb slides or is dragged along the direction of the index finger at a second rate or speed, the eyewear device 112 advances the cursor of the scroll bar and rotates the virtual objects 702 at a second rate or speed which matches or corresponds to the rate or speed of the thumb movement.

Once a given virtual object of interest is identified by a cursor, the eyewear device 112 can detect a gesture performed by the user's hand to activate a function associated with the given virtual object. For example, the virtual object may include a thumbnail representing a media asset (e.g., a music or video). In response to detecting that the thumb 912 taps or makes contact with the index finger, the eyewear device 112 activates a function to select the media asset represented by the thumbnail currently in focus and identified by the cursor. For example, the eyewear device 112 can retrieve and playback a music or video corresponding to the identified thumbnail in response to detecting the thumb 912 tapping or making contact with the index finger. As another example, the music or video corresponding to the identified thumbnail may be stopped or paused in response to detecting the thumb 912 tapping or making contact with the index finger.

Machine Architecture

Figure 10:
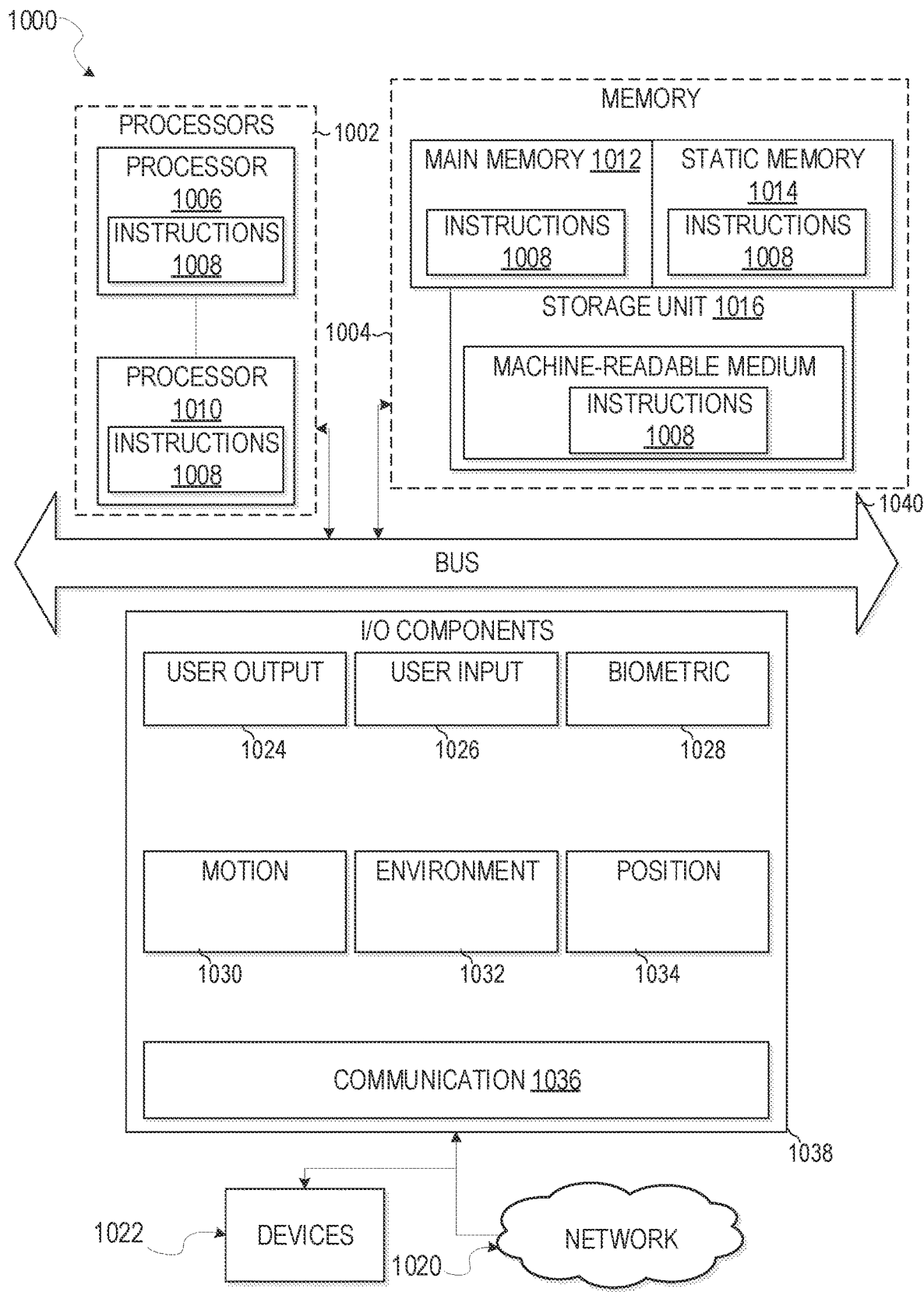
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output (I/O) components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, all accessible to the processors 1002 via the bus 1040. The main memory 1004, the static memory 1014, and the storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the processor's cache memory), or any suitable combination thereof, during execution thereof by the machine 1000.

The I/O components 1038 may include a wide variety of components to receive input, provide output, produce output, transmit information, exchange information, capture measurements, and so on. The specific 110 components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-lased identification), and the like. The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

Figure 11:
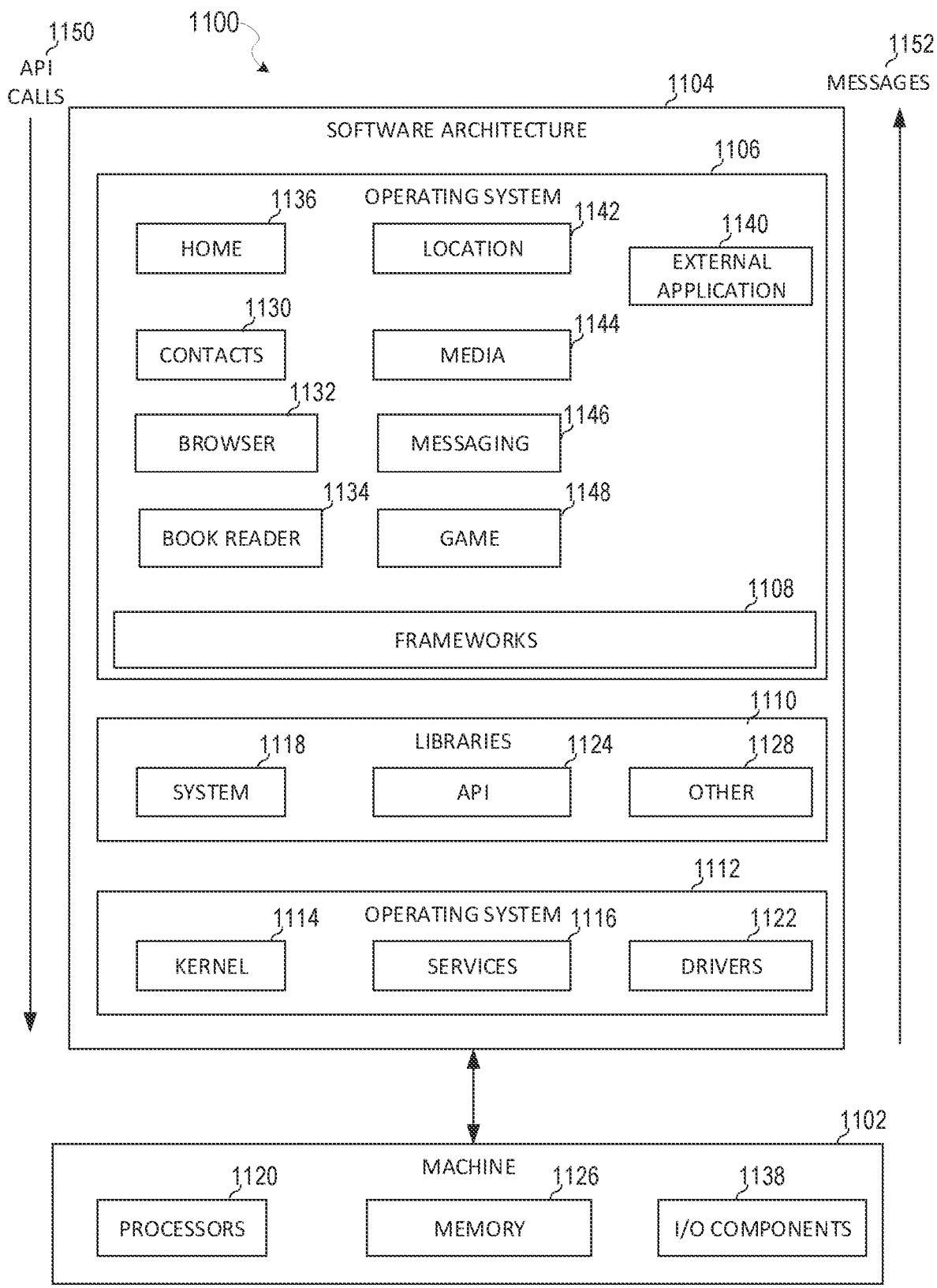
FIG. 11 is a block diagram showing a software architecture within which examples may be implemented.

The instructions 1008 may be transmitted or received over the network 1020, using a transmission medium, via a network interface device (e.g., a network interface component included in the communication components 1036) and using any one of several well-known transfer protocols (e.g., hypertext transfer protocol (HTTP)). Similarly, the instructions 1008 may be transmitted or received using a transmission medium via a coupling (e.g., a peer-to-peer coupling) to the devices Software Architecture FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D)

and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as a external application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the external application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1140 can invoke the API calls 1150 provided by the operating system 1112 to facilitate functionality described herein.

Glossary:

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a. server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code,", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

Modules, Components, and Logic

Certain embodiments are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application-Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

What is claimed is:

1. A method comprising:
   displaying, by one or more processors of an eyewear device, a scroll bar that extends along an x-axis and one or more virtual objects on the eyewear device including a first plurality of media assets associated with a first collection of media content;
   detecting, by a camera of the eyewear device, a hand within view of the eyewear device;
   generating a first virtual line representing an orientation of the one or more virtual objects;
   generating a second virtual line connecting two points of a first finger of the hand that represents an orientation of the first finger, the first finger comprising an index finger;
   measuring an angle formed between the first virtual line representing the orientation of the one or more virtual objects and the second virtual line representing the orientation of the first finger;
   determining that the first finger of the hand is oriented along a same direction as the one or more virtual objects that are displayed in response to determining that the angle, formed between the first virtual line representing the orientation of the one or more virtual objects and the second virtual line representing the orientation of the first finger, is less than a threshold value;
   detecting movement of a second finger of the hand relative to the first finger, the second finger comprising a thumb;
   establishing a relationship between distance of movement of the thumb and a number of pixels to scroll the one or more virtual objects;
   controlling the display of the one or more virtual objects in response to determining that the first finger is oriented along the same direction as the one or more virtual objects and in response to detecting movement of the second finger to the first finger;
   detecting input corresponding to dragging of the thumb along the orientation of the index finger to scroll the one or more virtual objects in a direction in which the thumb is being dragged;

determining that the thumb has been dragged a first distance along the orientation of the index finger;

determining, based on the relationship, a quantity of pixels associated with the first distance that the thumb has been dragged;

scrolling the one or more virtual objects by the quantity of pixels in the direction in which the thumb has been dragged the first distance;

after identifying a given virtual object of interest based on scrolling the one or more virtual objects, activating the given virtual object in response to determining that the index finger has been tapped by the thumb;

determining that the second finger moves in a first direction along the x-axis; and advancing the scroll bar towards the first direction and rotating the one or more virtual objects in the first direction, in response to determining that the second finger moves in the first direction along the x-axis.

2. The method of claim 1, wherein the one or more virtual objects comprises a plurality of thumbnails.

3. The method of claim 2, wherein the plurality of thumbnails represent respective media assets.

4. The method of claim 1, further comprising:
determining that the second finger moves in a second direction along the x-axis; and
advancing the scroll bar towards the second direction in response to determining that the second finger moves in the second direction along the x-axis.

5. The method of claim 1, further comprising:
determining that the second finger moves a first amount in a second direction that is perpendicular the first direction; and
replacing a display of the first plurality of media assets associated with the first collection of media content with a second plurality of media assets associated with a second collection of media content.

6. The method of claim 5, further comprising:
determining that the second finger moves a second amount in the second direction greater than the first amount; and
replacing a display of the second plurality of media assets associated with the second collection of media content with a third plurality of media assets associated with a third collection of media content.

7. The method of claim 5, further comprising:
determining that, after the second finger has moved by the first amount in the second direction, the second finger moves along the first direction; and
rotating the second plurality of media assets in response to determining that, after the second finger has moved by the first amount in the second direction, the second finger moves along the first direction.

8. The method of claim 1, wherein the one or more virtual objects comprises a plurality of thumbnails, and wherein the plurality of thumbnails are displayed in a three-dimensional cylindrical carousel.

9. The method of claim 1, further comprising:
determining that the second finger has made contact with the first finger;
determining that a given one of the one or more virtual objects is currently in focus; and
activating a function associated with the given one of the one or more virtual objects in response to determining that the second finger has made contact with the first finger.

10. The method of claim 1, further comprising:
drawing a third virtual line representing a direction of movement of the thumb;
computing a second angle formed between the third virtual line representing movement of the thumb to the second virtual line associated with the index finger;
determining that a difference between the second angle, formed between the third virtual line representing movement of the thumb and the second virtual line, and ninety degrees is less than a threshold; and
in response to determining that the difference between the second angle, formed between the third virtual line representing movement of the thumb and the second virtual line, and ninety degrees is less than the threshold, determining that the thumb has been moved in a perpendicular direction relative to the index finger to initiate scrolling the one or more virtual objects.

11. A system comprising:
a storage device of an eyewear device; and
at least one processor of an eyewear device configured to perform operations comprising:
displaying a scroll bar that extends along an x-axis and one or more virtual objects on the eyewear device including a first plurality of media assets associated with a first collection of media content;
detecting, by a camera of the eyewear device, a hand within view of the eyewear device;
generating a first virtual line representing an orientation of the one or more virtual objects;
generating a second virtual line connecting two points of a first finger of the hand that represents an orientation of the first finger, the first finger comprising an index finger,
measuring an angle formed between the first virtual line representing the orientation of the one or more virtual objects and the second virtual line representing the orientation of the first finger;
determining that the first finger of the hand is oriented along a same direction as the one or more virtual objects that are displayed in response to determining that the angle, formed between the first virtual line representing the orientation of the one or more virtual objects and the second virtual line representing the orientation of the first finger, is less than a threshold value;
detecting movement of a second finger of the hand relative to the first finger, the second finger comprising a thumb,
establishing a relationship between distance of movement of the thumb and a number of pixels to scroll the one or more virtual objects;
controlling the display of the one or more virtual objects in response to determining that the first finger is oriented along the same direction as the one or more virtual objects and in response to detecting movement of the second finger to the first finger;
detecting input corresponding to dragging of the thumb along the orientation of the index finger to scroll the one or more virtual objects in a direction in which the thumb is being dragged;
determining that the thumb has been dragged a first distance along the orientation of the index finger;
determining, based on the relationship, a quantity of pixels associated with the first distance that the thumb has been dragged;
scrolling the one or more virtual objects by the quantity of pixels in the direction in which the thumb has been dragged the first distance;

after identifying a given virtual object of interest based on scrolling the one or more virtual objects, activating the given virtual object in response to determining that the index finger has been tapped by the thumb;

determining that the second finger moves in a first direction along the x-axis; and advancing the scroll bar towards the first direction and rotating the one or more virtual objects in the first direction, in response to determining that the second finger moves in the first direction along the x-axis.

12. The system of claim 11, wherein the one or more virtual objects comprises a plurality of thumbnails.

13. The system of claim 11, the operations comprise:
switching between collections of media assets in response to determining that the thumb has been moved behind the index finger after having been in front of the index finger.

14. The system of claim 11, wherein the operations further comprise:
determining that the second finger moves in a second direction along the x-axis; and
advancing the scroll bar towards the second direction in response to determining that the second finger moves in the second direction along the x-axis.

15. The system of claim 11, wherein the operations further comprise:
determining that the second finger moves a first amount in a second direction that is perpendicular the first direction; and
replacing a display of the first plurality of media assets associated with the first collection of media content with a second plurality of media assets associated with a second collection of media content.

16. A non-transitory machine-readable storage medium comprising instructions that, when executed by one or more processors of a machine, cause the machine to perform operations comprising:
displaying a scroll bar that extends along an x-axis and one or more virtual objects on an eyewear device including a first plurality of media assets associated with a first collection of media content;
detecting, by a camera of the eyewear device, a hand within view of the eyewear device;
generating a first virtual line representing an orientation of the one or more virtual objects;
generating a second virtual line connecting two points of a first finger of the hand that represents an orientation of the first finger, the first finger comprising an index finger;
measuring an angle formed between the first virtual line representing the orientation of the one or more virtual objects and the second virtual line representing the orientation of the first finger;
determining that the first finger of the hand is oriented along a same direction as the one or more virtual objects that are displayed in response to determining that the angle, formed between the first virtual line representing the orientation of the one or more virtual objects and the second virtual line representing the orientation of the first finger, is less than a threshold value;
detecting movement of a second finger of the hand relative to the first finger, the second finger comprising a thumb;
establishing a relationship between distance of movement of the thumb and a number of pixels to scroll the one or more virtual objects;
controlling the display of the one or more virtual objects in response to determining that the first finger is oriented along the same direction as the one or more virtual objects and in response to detecting movement of the second finger to the first finger;
detecting input corresponding to dragging of the thumb along the orientation of the index finger to scroll the one or more virtual objects in a direction in which the thumb is being dragged;
determining that the thumb has been dragged a first distance along the orientation of the index finger;
determining, based on the relationship, a quantity of pixels associated with the first distance that the thumb has been dragged;
scrolling the one or more virtual objects by the quantity of pixels in the direction in which the thumb has been dragged the first distance;
after identifying a given virtual object of interest based on scrolling the one or more virtual objects, activating the given virtual object in response to determining that the index finger has been tapped by the thumb;
determining that the second finger moves in a first direction along the x-axis; and
advancing the scroll bar towards the first direction and rotating the one or more virtual objects in the first direction, in response to determining that the second finger moves in the first direction along the x-axis.

* * * * *